(12) United States Patent
Venkataraman et al.

(10) Patent No.: US 12,346,368 B2
(45) Date of Patent: Jul. 1, 2025

(54) SYSTEMS AND METHODS FOR DETERMINING WHETHER A NEGATION STATEMENT APPLIES TO A CURRENT OR PAST QUERY

(71) Applicant: Adeia Guides Inc., San Jose, CA (US)

(72) Inventors: Sashikumar Venkataraman, Andover, MA (US); Mangesh Pujari, Bangalore (IN); Ahmed Nizam Mohaideen P, Tamilnadu (IN)

(73) Assignee: Adeia Guides Inc., San Jose, CA (US)

( * ) Notice: Subject to any disclaimer, the term of this patent is extended or adjusted under 35 U.S.C. 154(b) by 113 days.

(21) Appl. No.: 17/858,550

(22) Filed: Jul. 6, 2022

(65) Prior Publication Data

US 2023/0026181 A1    Jan. 26, 2023

Related U.S. Application Data

(63) Continuation of application No. 16/707,074, filed on Dec. 9, 2019, now Pat. No. 11,423,074, which is a
(Continued)

(51) Int. Cl.
G06F 16/40    (2019.01)
G06F 16/48    (2019.01)

(52) U.S. Cl.
CPC .................................. *G06F 16/48* (2019.01)

(58) Field of Classification Search
None
See application file for complete search history.

(56) References Cited

U.S. PATENT DOCUMENTS

| | | | |
|---|---|---|---|
| 4,138,719 | A | 2/1979 | Swanstrom et al. |
| 4,509,133 | A | 4/1985 | Monbaron et al. |

(Continued)

FOREIGN PATENT DOCUMENTS

| | | |
|---|---|---|
| BR | 102014010766 A2 | 12/2015 |
| JP | H06266779 A | 9/1994 |

(Continued)

OTHER PUBLICATIONS

Anonymous, "Speech recognition", Anonymous: "Speech recognition—Wikipedia", Jan. 31, 2012, (Jan. 31, 2012), XP055700274, Retrieved from the Internet: URL:https://en.wikipedia.org/w/index.php?title=Speech recognition&oldid=4741 61019 [retrieved on Jun. 2, 2020].

(Continued)

*Primary Examiner* — Belix M Ortiz Ditren
(74) *Attorney, Agent, or Firm* — Haley Guiliano LLP

(57) ABSTRACT

Systems and methods for determining whether an ambiguous statement applies to a first query or second query. In some aspects, the system includes control circuitry that receives a first search query from a user. The control circuitry determines a syntactic mapping and contextual mapping of the first query. The control circuitry receives a second search query following the first search query. The control circuitry merges the queries. The control circuitry determines whether syntactic mappings for the second query and the portion of the merged query corresponding to the second query are equivalent. In response to determining that the second syntactic mapping and the portion of the third syntactic mapping are equivalent, the control circuitry selects a contextual mapping of the second or merged query based on user contextual information. The control circuitry determines a media asset from the media assets that is related to the first and second queries.

18 Claims, 9 Drawing Sheets

Related U.S. Application Data continuation of application No. 15/852,589, filed on Dec. 22, 2017, now Pat. No. 10,540,387, which is a continuation of application No. 14/581,163, filed on Dec. 23, 2014, now Pat. No. 9,852,136.

(56) References Cited

U.S. PATENT DOCUMENTS

| | | |
|---|---|---|
| 5,519,608 A | 5/1996 | Kupiec |
| 5,859,972 A | 1/1999 | Subramaniam et al. |
| 5,957,520 A | 9/1999 | Suda et al. |
| 5,960,394 A | 9/1999 | Gould et al. |
| 6,006,225 A | 12/1999 | Bowman et al. |
| 6,014,665 A | 1/2000 | Culliss |
| 6,021,403 A | 2/2000 | Horvitz et al. |
| 6,044,347 A | 3/2000 | Abella et al. |
| 6,064,960 A | 5/2000 | Bellegarda et al. |
| 6,092,043 A | 7/2000 | Squires et al. |
| 6,125,345 A | 9/2000 | Modi et al. |
| 6,144,958 A | 11/2000 | Ortega et al. |
| 6,195,635 B1 | 2/2001 | Wright |
| 6,236,968 B1 | 5/2001 | Kanevsky et al. |
| 6,256,664 B1 | 7/2001 | Donoho et al. |
| 6,272,455 B1 | 8/2001 | Hoshen et al. |
| 6,292,767 B1 | 9/2001 | Jackson et al. |
| 6,317,708 B1 | 11/2001 | Witbrock et al. |
| 6,408,293 B1 | 6/2002 | Aggarwal et al. |
| 6,662,365 B1 | 12/2003 | Sullivan et al. |
| 6,671,681 B1 | 12/2003 | Emens et al. |
| 6,718,324 B2 | 4/2004 | Edlund et al. |
| 6,856,986 B1 | 2/2005 | Rossides |
| 6,901,366 B1 | 5/2005 | Kuhn et al. |
| 7,117,207 B1 | 10/2006 | Kerschberg et al. |
| 7,130,923 B2 | 10/2006 | Mason |
| 7,143,078 B2 | 11/2006 | Doherty et al. |
| 7,308,404 B2 | 12/2007 | Venkataraman et al. |
| 7,346,549 B2 | 3/2008 | Deas et al. |
| 7,610,199 B2 | 10/2009 | Abrash et al. |
| 7,668,865 B2 | 2/2010 | McDonald |
| 7,672,951 B1 | 3/2010 | Bierner |
| 7,716,229 B1 | 5/2010 | Srivastava et al. |
| 7,725,321 B2 | 5/2010 | Bennett |
| 7,835,998 B2 | 11/2010 | Aravamudan et al. |
| 7,856,441 B1 | 12/2010 | Kraft et al. |
| 7,912,701 B1 | 3/2011 | Gray et al. |
| 7,930,168 B2 | 4/2011 | Weng et al. |
| 7,937,272 B2 | 5/2011 | Oomen et al. |
| 8,005,679 B2 | 8/2011 | Jordan et al. |
| 8,046,348 B1 | 10/2011 | Rehling et al. |
| 8,086,489 B2 | 12/2011 | Ramakrishna |
| 8,122,061 B1 | 2/2012 | Guinness |
| 8,156,129 B2 | 4/2012 | Zhou et al. |
| 8,156,138 B2 | 4/2012 | Kohn et al. |
| 8,219,407 B1 | 7/2012 | Roy et al. |
| 8,255,786 B1 | 8/2012 | Gattani et al. |
| 8,271,323 B2 | 9/2012 | Chatow et al. |
| 8,315,849 B1 | 11/2012 | Gattani et al. |
| 8,417,718 B1 | 4/2013 | Finkelstein et al. |
| 8,429,179 B1 | 4/2013 | Mirhaji |
| 8,494,853 B1 | 7/2013 | Mengibar et al. |
| 8,504,562 B1 | 8/2013 | Ikeda et al. |
| 8,515,985 B1 | 8/2013 | Zhou |
| 8,554,540 B2 | 10/2013 | Lee et al. |
| 8,560,477 B1 | 10/2013 | Petrov et al. |
| 8,583,670 B2 | 11/2013 | Cameron et al. |
| 8,600,980 B2 | 12/2013 | Jensen |
| 8,713,042 B1 | 4/2014 | Zinenko et al. |
| 8,725,180 B2 | 5/2014 | Lee et al. |
| 8,725,569 B2 | 5/2014 | Liang et al. |
| 8,756,216 B1 | 6/2014 | Ramesh et al. |
| 8,775,160 B1 * | 7/2014 | Roizen ............... G06F 16/3344 704/10 |
| 8,805,823 B2 | 8/2014 | Nitz |
| 8,812,534 B2 | 8/2014 | Platt et al. |
| 8,850,469 B1 | 9/2014 | Yang |
| 8,869,191 B2 | 10/2014 | Pickelsimer et al. |
| 8,880,423 B2 | 11/2014 | Zhang |
| 8,903,793 B2 | 12/2014 | Bangalore |
| 8,930,189 B2 | 1/2015 | Cath et al. |
| 8,954,318 B2 | 2/2015 | Barve et al. |
| 8,972,388 B1 | 3/2015 | Finkelstein et al. |
| 9,009,046 B1 | 4/2015 | Stewart |
| 9,020,110 B1 | 4/2015 | Baharav et al. |
| 9,031,216 B1 | 5/2015 | Kamvar et al. |
| 9,183,183 B2 | 11/2015 | Barve et al. |
| 9,251,225 B2 | 2/2016 | Stanfill |
| 9,355,191 B1 | 5/2016 | Finkelstein et al. |
| 9,361,365 B2 | 6/2016 | Sweeney et al. |
| 9,418,177 B1 | 8/2016 | Lloyd et al. |
| 9,424,233 B2 | 8/2016 | Barve et al. |
| 9,465,833 B2 | 10/2016 | Aravamudan et al. |
| 9,477,643 B2 | 10/2016 | Barve et al. |
| 9,514,497 B2 | 12/2016 | Baharav et al. |
| 9,542,482 B1 | 1/2017 | Sachan et al. |
| 9,547,832 B2 | 1/2017 | Gordon |
| 9,582,515 B1 | 2/2017 | Doubleday et al. |
| 9,785,976 B2 | 10/2017 | Guo et al. |
| 9,799,328 B2 | 10/2017 | Aravamudan et al. |
| 10,115,146 B1 | 10/2018 | Anderson et al. |
| 10,140,982 B2 | 11/2018 | Aravamudan et al. |
| 10,341,447 B2 | 7/2019 | Kelly et al. |
| 10,475,060 B2 | 11/2019 | Carlson et al. |
| 10,482,674 B1 | 11/2019 | Wu et al. |
| 10,795,886 B1 | 10/2020 | Samdani et al. |
| 10,896,184 B2 | 1/2021 | Aravamudan et al. |
| 11,017,411 B2 | 5/2021 | Macilwaine et al. |
| 11,250,081 B1 * | 2/2022 | Cowburn ............ G06F 16/2462 |
| 11,295,730 B1 | 4/2022 | Mohajer et al. |
| 11,423,074 B2 | 8/2022 | Venkataraman et al. |
| 11,811,889 B2 | 11/2023 | Kelly et al. |
| 11,847,151 B2 | 12/2023 | Aravamudan et al. |
| 11,991,257 B2 | 5/2024 | Kelly et al. |
| 11,997,176 B2 | 5/2024 | Kelly et al. |
| 12,032,643 B2 | 7/2024 | Barve et al. |
| 12,169,496 B2 | 12/2024 | Aravamudan et al. |
| 12,169,514 B2 | 12/2024 | Aravamudan et al. |
| 12,266,450 B1 | 4/2025 | Barve et al. |
| 2001/0049688 A1 | 12/2001 | Fratkina et al. |
| 2002/0040320 A1 | 4/2002 | Tanaka |
| 2002/0055916 A1 | 5/2002 | Jost et al. |
| 2002/0059069 A1 | 5/2002 | Hsu et al. |
| 2002/0065813 A1 | 5/2002 | Scanlon et al. |
| 2002/0065884 A1 | 5/2002 | Donoho et al. |
| 2002/0173956 A1 | 11/2002 | Hartley et al. |
| 2003/0069879 A1 | 4/2003 | Sloan et al. |
| 2003/0101047 A1 | 5/2003 | Panttaja |
| 2003/0101286 A1 | 5/2003 | Kolluri et al. |
| 2003/0188307 A1 | 10/2003 | Mizuno |
| 2003/0216912 A1 | 11/2003 | Chino |
| 2004/0015985 A1 | 1/2004 | Kweon |
| 2004/0019588 A1 | 1/2004 | Doganata et al. |
| 2004/0126840 A1 | 7/2004 | Cheng et al. |
| 2004/0194141 A1 | 9/2004 | Sanders |
| 2004/0243557 A1 | 12/2004 | Broder et al. |
| 2004/0249808 A1 | 12/2004 | Azzam et al. |
| 2005/0028191 A1 | 2/2005 | Sullivan et al. |
| 2005/0049852 A1 | 3/2005 | Chao |
| 2005/0055321 A1 | 3/2005 | Fratkina et al. |
| 2005/0080613 A1 | 4/2005 | Colledge et al. |
| 2005/0131677 A1 | 6/2005 | Assadollahi |
| 2005/0197828 A1 | 9/2005 | McConnell et al. |
| 2005/0204380 A1 | 9/2005 | Lee |
| 2005/0246740 A1 | 11/2005 | Teraci et al. |
| 2005/0283468 A1 | 12/2005 | Kamvar et al. |
| 2006/0026279 A1 | 2/2006 | Zigmond et al. |
| 2006/0074661 A1 | 4/2006 | Takaichi et al. |
| 2006/0074670 A1 | 4/2006 | Weng et al. |
| 2006/0074870 A1 | 4/2006 | Brill et al. |
| 2006/0110711 A1 | 5/2006 | Julia et al. |
| 2006/0112091 A1 | 5/2006 | Chapman et al. |
| 2006/0206326 A1 | 9/2006 | Fukada |
| 2006/0206454 A1 | 9/2006 | Forstall et al. |
| 2006/0282414 A1 | 12/2006 | Sugihara et al. |
| 2006/0282776 A1 | 12/2006 | Farmer et al. |

(56) References Cited

U.S. PATENT DOCUMENTS

| | | |
|---|---|---|
| 2007/0005570 A1 | 1/2007 | Hurst-Hiller et al. |
| 2007/0043574 A1 | 2/2007 | Coffman et al. |
| 2007/0050339 A1 | 3/2007 | Kasperski et al. |
| 2007/0055529 A1 | 3/2007 | Kanevsky et al. |
| 2007/0060099 A1 | 3/2007 | Ramer et al. |
| 2007/0061245 A1 | 3/2007 | Ramer et al. |
| 2007/0061334 A1 | 3/2007 | Ramer et al. |
| 2007/0073540 A1 | 3/2007 | Hirakawa et al. |
| 2007/0073799 A1 | 3/2007 | Adjali et al. |
| 2007/0078815 A1 | 4/2007 | Weng et al. |
| 2007/0094221 A1 | 4/2007 | Au |
| 2007/0136251 A1 | 6/2007 | Colledge et al. |
| 2007/0174258 A1 | 7/2007 | Jones et al. |
| 2007/0192101 A1 | 8/2007 | Braho et al. |
| 2007/0225980 A1 | 9/2007 | Sumita |
| 2007/0255702 A1 | 11/2007 | Orme |
| 2007/0271205 A1 | 11/2007 | Aravamudan et al. |
| 2008/0010352 A1 | 1/2008 | Donoho et al. |
| 2008/0077570 A1 | 3/2008 | Tang et al. |
| 2008/0091656 A1 | 4/2008 | Charnock et al. |
| 2008/0091670 A1* | 4/2008 | Ismalon ............... G06F 16/3322 707/999.005 |
| 2008/0104032 A1 | 5/2008 | Sarkar |
| 2008/0104037 A1 | 5/2008 | Bierner |
| 2008/0114759 A1 | 5/2008 | Yahia et al. |
| 2008/0120072 A1 | 5/2008 | Bartz et al. |
| 2008/0120093 A1 | 5/2008 | Izumida et al. |
| 2008/0126552 A1 | 5/2008 | Berger et al. |
| 2008/0154611 A1 | 6/2008 | Evermann et al. |
| 2008/0155701 A1 | 6/2008 | Martinez et al. |
| 2008/0221866 A1 | 9/2008 | Katragadda et al. |
| 2008/0235202 A1 | 9/2008 | Wang et al. |
| 2008/0243619 A1 | 10/2008 | Sharman et al. |
| 2008/0270110 A1 | 10/2008 | Yurick et al. |
| 2008/0270138 A1 | 10/2008 | Knight et al. |
| 2008/0270344 A1 | 10/2008 | Yurick et al. |
| 2009/0006343 A1 | 1/2009 | Platt et al. |
| 2009/0019002 A1 | 1/2009 | Boulis |
| 2009/0063472 A1 | 3/2009 | Pell et al. |
| 2009/0106224 A1 | 4/2009 | Roulland et al. |
| 2009/0144609 A1 | 6/2009 | Liang et al. |
| 2009/0150343 A1 | 6/2009 | English et al. |
| 2009/0198488 A1 | 8/2009 | Vigen |
| 2009/0203359 A1 | 8/2009 | Makhoul et al. |
| 2009/0210232 A1 | 8/2009 | Sanchez |
| 2009/0222853 A1 | 9/2009 | White et al. |
| 2009/0276396 A1 | 11/2009 | Gorman et al. |
| 2009/0281923 A1 | 11/2009 | Selinger et al. |
| 2009/0282333 A1 | 11/2009 | Olsen et al. |
| 2010/0010989 A1 | 1/2010 | Li et al. |
| 2010/0049684 A1 | 2/2010 | Adriaansen et al. |
| 2010/0057801 A1 | 3/2010 | Ramer et al. |
| 2010/0094854 A1 | 4/2010 | Rouhani-Kalleh |
| 2010/0138296 A1 | 6/2010 | Ramer et al. |
| 2010/0153112 A1 | 6/2010 | Phillips et al. |
| 2010/0153885 A1 | 6/2010 | Yates |
| 2010/0161605 A1 | 6/2010 | Gabrilovich et al. |
| 2010/0185649 A1 | 7/2010 | Zhou et al. |
| 2010/0198837 A1* | 8/2010 | Wu ............... G06F 16/24578 707/E17.014 |
| 2010/0223223 A1 | 9/2010 | Sandler et al. |
| 2010/0228540 A1 | 9/2010 | Bennett |
| 2010/0262456 A1 | 10/2010 | Feng et al. |
| 2010/0332305 A1 | 12/2010 | Higgins et al. |
| 2011/0015996 A1 | 1/2011 | Kassoway et al. |
| 2011/0029311 A1 | 2/2011 | Minamino et al. |
| 2011/0066643 A1 | 3/2011 | Cooper et al. |
| 2011/0066644 A1 | 3/2011 | Cooper et al. |
| 2011/0066645 A1 | 3/2011 | Cooper et al. |
| 2011/0071819 A1 | 3/2011 | Miller et al. |
| 2011/0119047 A1 | 5/2011 | Ylonen |
| 2011/0119282 A1 | 5/2011 | Gorman et al. |
| 2011/0131043 A1 | 6/2011 | Adachi et al. |
| 2011/0145224 A1 | 6/2011 | Bangalore |
| 2011/0179114 A1 | 7/2011 | Dilip et al. |
| 2011/0179440 A1 | 7/2011 | Anderson et al. |
| 2011/0209047 A1 | 8/2011 | Olsen et al. |
| 2011/0218808 A1* | 9/2011 | Parthasarathy ....... G06F 3/0237 704/E15.018 |
| 2011/0224978 A1 | 9/2011 | Sawada |
| 2011/0225192 A1* | 9/2011 | Imig ............... G06F 16/3325 707/775 |
| 2011/0295687 A1 | 12/2011 | Bilenko et al. |
| 2011/0314010 A1 | 12/2011 | Ganti et al. |
| 2011/0320187 A1 | 12/2011 | Motik et al. |
| 2012/0016678 A1 | 1/2012 | Gruber et al. |
| 2012/0053942 A1 | 3/2012 | Minamino et al. |
| 2012/0054627 A1 | 3/2012 | Priyadarshan et al. |
| 2012/0095834 A1 | 4/2012 | Doig et al. |
| 2012/0109953 A1* | 5/2012 | Brown ............... G06Q 10/063 707/736 |
| 2012/0124071 A1 | 5/2012 | Gebhard et al. |
| 2012/0143965 A1 | 6/2012 | Parker et al. |
| 2012/0166371 A1 | 6/2012 | Sweeney et al. |
| 2012/0166372 A1 | 6/2012 | Ilyas et al. |
| 2012/0221557 A1 | 8/2012 | Edmonds et al. |
| 2012/0246165 A1 | 9/2012 | Batraski et al. |
| 2012/0265787 A1 | 10/2012 | Hsu et al. |
| 2012/0310622 A1 | 12/2012 | Zivkovic et al. |
| 2012/0323948 A1 | 12/2012 | Li et al. |
| 2013/0024211 A1 | 1/2013 | Monteforte et al. |
| 2013/0054245 A1 | 2/2013 | Chang et al. |
| 2013/0103387 A1* | 4/2013 | Kinder ............... G06F 3/04842 704/9 |
| 2013/0132109 A1 | 5/2013 | Mruthyunjaya et al. |
| 2013/0145385 A1 | 6/2013 | Aghajanyan et al. |
| 2013/0155068 A1 | 6/2013 | Bier et al. |
| 2013/0158980 A1 | 6/2013 | Landry et al. |
| 2013/0167168 A1 | 6/2013 | Ellis et al. |
| 2013/0173269 A1 | 7/2013 | Adler et al. |
| 2013/0179440 A1 | 7/2013 | Gordon |
| 2013/0185368 A1 | 7/2013 | Nordstrom et al. |
| 2013/0246430 A1 | 9/2013 | Szucs et al. |
| 2013/0262485 A1 | 10/2013 | Li et al. |
| 2013/0262501 A1 | 10/2013 | Kuchmann-Beauger et al. |
| 2013/0282702 A1 | 10/2013 | Zhu et al. |
| 2013/0291004 A1 | 10/2013 | Yuan et al. |
| 2013/0297285 A1 | 11/2013 | Kwon et al. |
| 2013/0332438 A1 | 12/2013 | Li et al. |
| 2013/0339380 A1 | 12/2013 | Meschkat |
| 2014/0006951 A1 | 1/2014 | Hunter |
| 2014/0046891 A1 | 2/2014 | Banas |
| 2014/0046934 A1 | 2/2014 | Zhou et al. |
| 2014/0074606 A1 | 3/2014 | Graham et al. |
| 2014/0074842 A1 | 3/2014 | Tal et al. |
| 2014/0149399 A1 | 5/2014 | Kurzion |
| 2014/0164507 A1 | 6/2014 | Tesch et al. |
| 2014/0214401 A1 | 7/2014 | Li et al. |
| 2014/0214840 A1 | 7/2014 | Gupta et al. |
| 2014/0223481 A1 | 8/2014 | Fundament |
| 2014/0236572 A1 | 8/2014 | Meshulam et al. |
| 2014/0280289 A1 | 9/2014 | Marantz et al. |
| 2014/0280291 A1 | 9/2014 | Collins et al. |
| 2014/0297252 A1 | 10/2014 | Prasad et al. |
| 2014/0297666 A1 | 10/2014 | Morris |
| 2014/0337370 A1 | 11/2014 | Aravamudan et al. |
| 2014/0337381 A1 | 11/2014 | Aravamudan et al. |
| 2015/0006290 A1 | 1/2015 | Tomkins et al. |
| 2015/0006564 A1 | 1/2015 | Tomkins et al. |
| 2015/0012524 A1* | 1/2015 | Heymans ............... G06F 16/335 707/722 |
| 2015/0058117 A1 | 2/2015 | Yehaskel et al. |
| 2015/0081656 A1 | 3/2015 | Wang et al. |
| 2015/0154643 A1 | 6/2015 | Artman et al. |
| 2015/0161673 A1 | 6/2015 | Guo et al. |
| 2015/0169701 A1 | 6/2015 | Stekkelpak et al. |
| 2015/0278961 A1 | 10/2015 | Ratti |
| 2015/0312629 A1 | 10/2015 | Bugajski et al. |
| 2016/0080292 A1 | 3/2016 | Szeto |
| 2016/0162574 A1 | 6/2016 | Gorodilov |
| 2016/0179801 A1 | 6/2016 | Venkataraman et al. |
| 2016/0189217 A1 | 6/2016 | Burgess et al. |
| 2016/0226984 A1 | 8/2016 | Kelly et al. |
| 2016/0227283 A1 | 8/2016 | Kelly et al. |

(56) References Cited

U.S. PATENT DOCUMENTS

| | | |
|---|---|---|
| 2016/0275453 A1 | 9/2016 | Powers et al. |
| 2016/0342702 A1 | 11/2016 | Barve et al. |
| 2016/0351187 A1 | 12/2016 | Dandekar et al. |
| 2017/0004184 A1 | 1/2017 | Jain et al. |
| 2017/0017719 A1 | 1/2017 | Aravamudan et al. |
| 2017/0060855 A1 | 3/2017 | Song et al. |
| 2017/0140405 A1 | 5/2017 | Gottemukkala et al. |
| 2017/0262449 A1 | 9/2017 | Venkataraman et al. |
| 2017/0270159 A1* | 9/2017 | Wang .................. G06F 16/2425 |
| 2017/0365254 A1 | 12/2017 | Aravamudan et al. |
| 2018/0052915 A1 | 2/2018 | Cohn et al. |
| 2018/0181661 A1 | 6/2018 | Jiron et al. |
| 2018/0225013 A1 | 8/2018 | Barrett et al. |
| 2018/0226073 A1 | 8/2018 | Hodge et al. |
| 2018/0260445 A1 | 9/2018 | Aravamudan et al. |
| 2018/0277113 A1 | 9/2018 | Hartung et al. |
| 2018/0308202 A1 | 10/2018 | Appu et al. |
| 2018/0342174 A1 | 11/2018 | Zhang et al. |
| 2018/0349755 A1 | 12/2018 | Gao et al. |
| 2018/0359477 A1 | 12/2018 | Yang |
| 2019/0051317 A1 | 2/2019 | Aravamudan et al. |
| 2019/0108447 A1 | 4/2019 | Kounavis et al. |
| 2019/0164553 A1 | 5/2019 | Leeb |
| 2019/0179861 A1 | 6/2019 | Goldenstein et al. |
| 2019/0197357 A1 | 6/2019 | Anderson et al. |
| 2019/0268289 A1 | 8/2019 | Brown et al. |
| 2019/0295211 A1 | 9/2019 | Appu et al. |
| 2019/0318648 A1 | 10/2019 | Zhang et al. |
| 2019/0335007 A1 | 10/2019 | Kelly et al. |
| 2020/0110578 A1 | 4/2020 | Miller et al. |
| 2020/0279019 A1 | 9/2020 | Peterson et al. |
| 2020/0302110 A1 | 9/2020 | Agostino et al. |
| 2020/0327197 A1 | 10/2020 | Bhowal et al. |
| 2020/0351361 A1 | 11/2020 | Kelly et al. |
| 2020/0365148 A1 | 11/2020 | Ji et al. |
| 2020/0372117 A1 | 11/2020 | Han et al. |
| 2021/0157813 A1 | 5/2021 | Hammad et al. |
| 2021/0173834 A1 | 6/2021 | Aravamudan et al. |
| 2021/0201932 A1 | 7/2021 | Aravamudan et al. |
| 2021/0314413 A1 | 10/2021 | Kelly et al. |
| 2021/0319048 A1 | 10/2021 | Aravamudan et al. |
| 2022/0058347 A1 | 2/2022 | Singaraju et al. |
| 2022/0222211 A1 | 7/2022 | Lynch et al. |
| 2023/0019782 A1 | 1/2023 | Barve et al. |
| 2023/0125513 A1 | 4/2023 | Kelly et al. |
| 2023/0135944 A1 | 5/2023 | Kelly et al. |
| 2023/0138953 A1 | 5/2023 | Kelly et al. |
| 2023/0205798 A1 | 6/2023 | Aravamudan et al. |
| 2023/0206940 A1 | 6/2023 | Aravamudan et al. |
| 2024/0000035 A1 | 1/2024 | McGowen |
| 2024/0357020 A1 | 10/2024 | Kelly et al. |
| 2025/0077605 A1 | 3/2025 | Barve et al. |
| 2025/0106061 A1 | 3/2025 | Wang et al. |
| 2025/0106177 A1 | 3/2025 | Bouguerra et al. |

FOREIGN PATENT DOCUMENTS

| | | |
|---|---|---|
| JP | H09146972 A | 6/1997 |
| JP | 2001034292 A | 2/2001 |
| JP | 2001043246 A | 2/2001 |
| JP | 2001100787 A | 4/2001 |
| JP | 2001175680 A | 6/2001 |
| JP | 2002108915 A | 4/2002 |
| JP | 2003058538 A | 2/2003 |
| JP | 2004362280 A | 12/2004 |
| JP | 2006107469 A | 4/2006 |
| JP | 2007511016 A | 4/2007 |
| JP | 2008243047 A | 10/2008 |
| JP | 2009037603 A | 2/2009 |
| JP | 2009163688 A | 7/2009 |
| JP | 2010205265 A | 9/2010 |
| KR | 101322821 B1 | 10/2013 |
| WO | 9813771 A1 | 4/1998 |
| WO | 02073331 A2 | 9/2002 |
| WO | 2007089967 A2 | 8/2007 |
| WO | 2007103938 A2 | 9/2007 |
| WO | 2010093618 A2 | 8/2010 |
| WO | 2011088053 A2 | 7/2011 |
| WO | 2012088590 A1 | 7/2012 |
| WO | 2016123188 A1 | 8/2016 |

OTHER PUBLICATIONS

Denis Alexandre, et al., "Resolution of Referents Grouping in Practical Dialogues" 7th Sigdial Workshop on Discourse and Dialogue Jan. 1, 2006, Sydney, Australia.

Kumar Ashwani, et al., Reference resolution as a facilitating process towards robust multimodal dialogue management: A cognitive grammar approach,, Jan. 1, 2003, 8.

Ninomiya et al., "A Diagramming tool of the conversation for communication support," The Institute of Electronics Information and Communication Engineers, Technical Report of IEICA, IN2004-168, TM2004-91.OIS2004-89 (Jan. 2005) (7 pages).

U.S. Appl. No. 17/354,295, filed Jun. 22, 2021, Timothy Christensen Kelly.

U.S. Appl. No. 18/087,041, filed Dec. 22, 2022, Timothy Christensen Kelly.

U.S. Appl. No. 17/873,912, filed Jul. 26, 2022, Rakesh Barve.

U.S. Appl. No. 17/202,496, filed Mar. 16, 2021, Murali Aravamudan.

Denis et al., "Resolution of Referents Groupings in Practical Dialogues", 7th Sigdial Workshop on Discourse and Dialogue—SIGDIAL'06, Jan. 1, 2006, Sydney, Australia DOI: 10.3115/1654595.1654608 (7 pages).

Jurafsky et al., "Chapter 21: Computational Discourse" In: "Computational Linguistics (Online)", MIT Press, Cambridge, MA, USA (2007) (47 pages).

Venkataraman et al., "A Natural Language Interface for Search and Recommendations of Digital Entertainment Media", IBC 2015 Conference, pp. 1-11, XP055274592 (2015) (11 pages).

Rish, "An Empirical Study of the Naïve Bayes Classifier", IBM (Year: 2001).

U.S. Appl. No. 18/632,004, filed Apr. 10, 2024, Timothy Christensen Kelly.

U.S. Appl. No. 18/734,946, filed Jun. 5, 2024, Rakesh Barve.

U.S. Appl. No. 18/115,466, filed Feb. 28, 2023, Murali Aravamudan.

U.S. Appl. No. 17/122,347, filed Dec. 15, 2020, Murali Aravamudan.

U.S. Appl. No. 18/115,612, filed Feb. 28, 2023, Murali Aravamudan.

* cited by examiner

SYSTEMS AND METHODS FOR DETERMINING WHETHER A NEGATION STATEMENT APPLIES TO A CURRENT OR PAST QUERY

CROSS-REFERENCE TO RELATED APPLICATIONS

This application is a continuation of U.S. patent application Ser. No. 16/707,074, filed Dec. 9, 2019, which is a continuation of U.S. patent application Ser. No. 15/852,589, filed Dec. 22, 2017 (now U.S. Pat. No. 10,540,387), which is a continuation of U.S. patent application Ser. No. 14/581,163, filed Dec. 23, 2014 (now U.S. Pat. No. 9,852,136), the disclosures of each application are incorporated by reference in their entireties.

BACKGROUND

Users who interact with automatic speech recognition systems for interactive media systems often desire to have a natural conversation with the system. For example, a user may issue multiple search queries, and expect the interactive media system to remember previous queries and distinguish between corrections to previous queries and new queries. However, conventional systems lack this natural conversation aspect, being based on a syntactic interpretation of queries which often inaccurately assigns user input as referring to an earlier query, or being a new query. Accordingly, such conventional systems are inconvenient to use, especially when a user hesitates or uses short hand to modify a previous query. Conventional systems are unable to correctly interpret ambiguities in a sentence such as negation elements or expressions which may yield multiple meanings to the sentence. Such conventional systems lack an effective mechanism for correctly analyzing queries within the context of a conversation.

SUMMARY

Users interacting with automatic speech recognition systems may create ambiguities in their queries, making it difficult for the system to provide accurate search results. For example, a user may use a negation element, and create an ambiguity as to whether the negation element applies to the current query, or a previous query. When a syntactic analysis of search queries is insufficient, the system uses contextual information to resolve the ambiguity.

For any query, the system determines a syntactic mapping and a contextual mapping of the query. For example, a user may query "Show me some Beethoven movies." A syntactic mapping may be a representation of the elements in the query. In some aspects, a syntactic mapping is a representation of the query in terms of syntactic identifiers, e.g. logical or grammatical elements determined based on sentence structure. For example, the system may parse the query into elements, which may be words, or groups of words: "Show me," "some," "Beethoven," "movies." The system, by reference to a syntactic database, may assign syntactic identifiers to each parsed element of the query. For example, by reference to a syntactic database, the system may assign an identifier to "show me" indicating an action verb, an identifier to "some" indicating a measure, and an identifier to "movies" indicating a type. The syntactic mapping created may also include assigning a more specific identifier such as an identifier for "Beethoven" indicating a movie title. A contextual mapping may be a representation of the contextual connections between identifiers associated with the words or groups of words. In some aspects, a contextual mapping is a representation of the query in terms of contextual identifiers, and the relationships between those identifiers, as informed by conversation heuristics and user preferences. The contextual mapping, informed by a contextual database, may connect context identifiers with the user information, and context identifiers from previous queries. In some aspects, the user information includes information stored in a user profile, a user query history, and user speech-to-text preferences or speech patterns, and a contextual database.

A contextual mapping may provide additional information regarding the meaning of the query. For example, for a user saying "Show me some Beethoven hmmm . . . movies," the syntactic mapping would be identical to the syntactic mapping for "Show me some Beethoven movies." However, for the "Show me some Beethoven hmmm . . . movies," a contextual mapping, by reference to the contextual database may assign and connect contextual identifiers for the words or groups of words. A contextual identifier for the word "hmmm . . ." may indicate "hesitation" or "undecided." The context database may store relationships between contextual identifiers, for users in general, or for a particular user. For example, the context database may store a rule between an "undecided" identifier, and other identifier. For example, a rule may be that an undecided identifier usually refers to another type of contextual identifier. In another example, a rule may be to disregard an undecided identifier, unless it is associated with another contextual identifier within a certain period of time. In the case of a single query, the system may not necessarily determine additional information based on the contextual mapping.

As conversations between the user and the system become longer, the system may encounter more ambiguities, such as negation elements, pronouns, etc., which may refer to elements of a current query, or elements of earlier queries. To enable natural dialogues, the systems and methods store the context of the user's earlier queries, e.g., intent and entities, and may refer to them appropriately to determine the user's future queries. In a multi-query conversation, when there is an ambiguity in the current query, the system first tries to resolve the ambiguity by comparing the syntax of the current query (a syntactic mapping of the current query), and the syntax of a merged query comprising the current query and a previous query (a syntactic mapping of the merged query). If the syntactic mapping of the current query, and the syntactic mapping of the portion of the merged query corresponding to the second query are different, the system may be able to resolve the ambiguity by selecting the most appropriate syntactic mapping.

For example, if a first user query is "Show me" and a second user query is "The Today Show" a syntactic mapping of the merged query will correctly determine that "Show" in "the today show" is different from the action verb "Show" in the first query, based on the typical sentence structure displayed by the merged query. Accordingly, the system can display to the user media assets associated with "the today show"

However, if the system is unable to resolve the ambiguity, i.e. if the syntax of the merged query provides no additional information to resolve the ambiguity, the system uses contextual cues to resolve the ambiguity. For example, a user may generate a first query "Show me some Beethoven movies," and a second query, with a negation element "Not the dog." In this example, a syntactic mapping of the second query "Not the dog" and a syntactic mapping of the portion of the merged query "Show me some Beethoven movies. Not the dog," corresponding to the second query provides no additional information with respect to the ambiguous term "Not," and whether it applies to the first or second search query.

The system will determine contextual cues for the second query, and contextual cues for the merged query. Based on a contextual database, including user information, the system will select either set of contextual cues. For example, an identifier indicating "negation" may be associated with "not," and the contextual database may store a rule that "not" generally applies to terms located before "not." In the second query, there are no terms before "not." However, in the merged query, a contextual identifier associated with "not" and a contextual identifier associated with "Beethoven," for example representing a name, will match the stored rule that if a name identifier is present prior to the negation identifier for "not," "not" applies to the name. In some embodiments, contextual rules may include operators such as AND, OR, BUT, and NOT. Contextual rules stored in the contextual database may be general or specific. Contextual rules stored in the contextual database may also be general to all users or specific to a particular user. Contextual rules or identifiers may be updated, or new rules created based on inferences. Similarly, syntactic rules or identifiers may be updated, or new rules created based on inferences.

A pause may create ambiguities, and may be associated with a context identifier indicating a new conversation, or indecision, depending on the user. For a fast talking user, a 1-2 second pause may be associated with a context identifier for a new query or conversation. For a slow talking user, a 1-2 second pause may indicate indecision, or dissatisfaction with the results. In turn, the system and methods may look to other context identifiers either located before or after in the conversation to form associations between context identifiers.

For example, a user Joe can store information indicating that when he pauses between queries for more than 5 seconds, he intended the next query to be a new query. In another example, a user Jane can store user information indicating that when she starts a query with 'I don't like that,' she means to correct an earlier query. Either user can continue the dialogue-style query as tailored to their preferences.

In another example, a user may query for "Beethoven movies," followed by a pause, and "No, the dog." In this example, a context identifier for "No" may be "negation" and a context identifier for the pause between the words "movies" and "No" may be "short pause." Based on the context information and general contextual mapping present in a context database, the system may determine that the "negation" identifier following a "Short pause" indicates a dissatisfaction with the results of the first query, which was interpreted to be the musician. Accordingly, the system will apply the "negation" identifier to exclude Beethoven the musician from future search results.

In another example, a user says 'Hhmph, not that'. The system and methods may determine that the context identifier associated with "not", if present 1-3 seconds after the context identifier associated with "Hmph" requires the negation "not" to be applied to the previous query. In another example, 'Hmmm', 'Hmph' and 'Mmmm' may all be associated with a context identifier indicating dissatisfaction, such that the user saying "Hmph, not that", 'Hmmm, not that,' and 'Mmm, not that,' will have the same effect.

Once a contextual mapping has been selected, either one for the second query, or one for the merged query, the system will then proceed to provide the user with media related to the queries, consistent with the selected contextual cues.

In some embodiments, an ambiguity in a query may be the result of a speech-to-text translation problem, i.e., ASR error. If a problem is predicted, instead of showing irrelevant results for the query with the ASR error, the systems and methods may convey the ASR error to the user in a suitable response so that the user knows that the interactive media system is aware of the ASR error. For example, a user with a search history of classical music may query "Show me furry Beethoven movies." In this example, the interactive media system may predict an ASR error. For example, the system may detect that the user may have meant "Beethoven, funny" instead of "Beethoven, furry." In some embodiments, the system conveys the ASR error to the user, for example by saying "I think you meant funny." Since the user knows that the interactive media system is aware of the ASR error, he may ignore the query with the ASR error and continue the dialogue without having to repeat the contextual information from earlier queries. Based on the context stored, the interactive media system may interpret and answer the new queries despite the intermediate query that contained the ASR error. In some embodiments, the user may be prompted to correct the ASR error.

In some embodiments, an ambiguity in a query may be detected after finding unusual search results. For example, the results to a first query may be inconsistent with the user profile, or previous search results. If an inconsistency in results is detected, instead of showing irrelevant results for the ambiguous query, the systems and method may convey the inconsistency to the user, so that the user can confirm the query or modify it with the next query. For example, a user with a search history of classical music may query "Show me funny Beethoven movies." The systems and methods may recognize the query as a request for "Funny Beethoven." The interactive media system may find a weak classification score for the intersection of "Beethoven" and "funny" or may not be able to classify the queries at all. Alternatively, the interactive media system may find few to no relevant search results matching the search query. The interactive media system may display an error message to the user such as "Possible interpretation error. Maybe you meant something else. Try again?" before displaying any results.

In some embodiments, as mentioned above, an ambiguity in a later query may be introduced by a pause, or a modifier such as an indicator of a negation. For example, the interactive media system may receive speech-to-text input including "show me some Beethoven movies," and retrieves search results along with a message "I got some Beethoven related programs for you." A second query may be "No, the dog." or "No, the musician." The interactive media system interprets both of these speech-to-text inputs with a negation to mean that the user is dissatisfied, and was not searching for Beethoven the musician, but instead Beethoven the dog. In the case of "No, the dog," the systems and methods assign "no" to the previous search results or earlier query terms. In the case of "not the musician," the systems and methods assign "not" to the later query term "musician" to filter out later search results. The systems and methods interpret the 'not' or 'no' as a modifier to the first or second query.

As discussed above, the system and methods determine to which query "No" or "not" applies by assigning context identifiers to the second query, and to a merged query consisting of the current and previous queries, and using connections between context identifiers, stored in a context database. Context identifiers and the rules that govern them provide additional information with respect to the user's intent for the query's meaning.

The interactive media system may store possible entities and interpretations of a query in the background but present only the most probable entity/interpretation to the user. If the user is not satisfied with the result, the interactive media system may allow the user to provide additional clues without repeating the earlier query. The interactive media system may use the additional clues provided by the user to narrow down the results among the interpretations and entities that were stored for the earlier query. The narrowing down of the search results may be based on one or more heuristics including popularity of entities (e.g., more popular entities are more likely interpretations), temporal relevance (e.g., sports teams which are playing in current time as opposed to off-season teams), and connections between the entities corresponding to different terms in the query (e.g., in user query "Beethoven," "funny" most probably refers to "Beethoven the dog" due to connection to "Beethoven" via the movie type, e.g. comedy.

In some aspects, the systems and methods described herein include a method, an apparatus, or non-transitory machine-readable media for searching for a media asset configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent under consideration of the following detailed description, taken in conjunction with the accompanying drawings, in which like reference characters refer to like parts throughout, and in which.

DESCRIPTION

Figure 1:
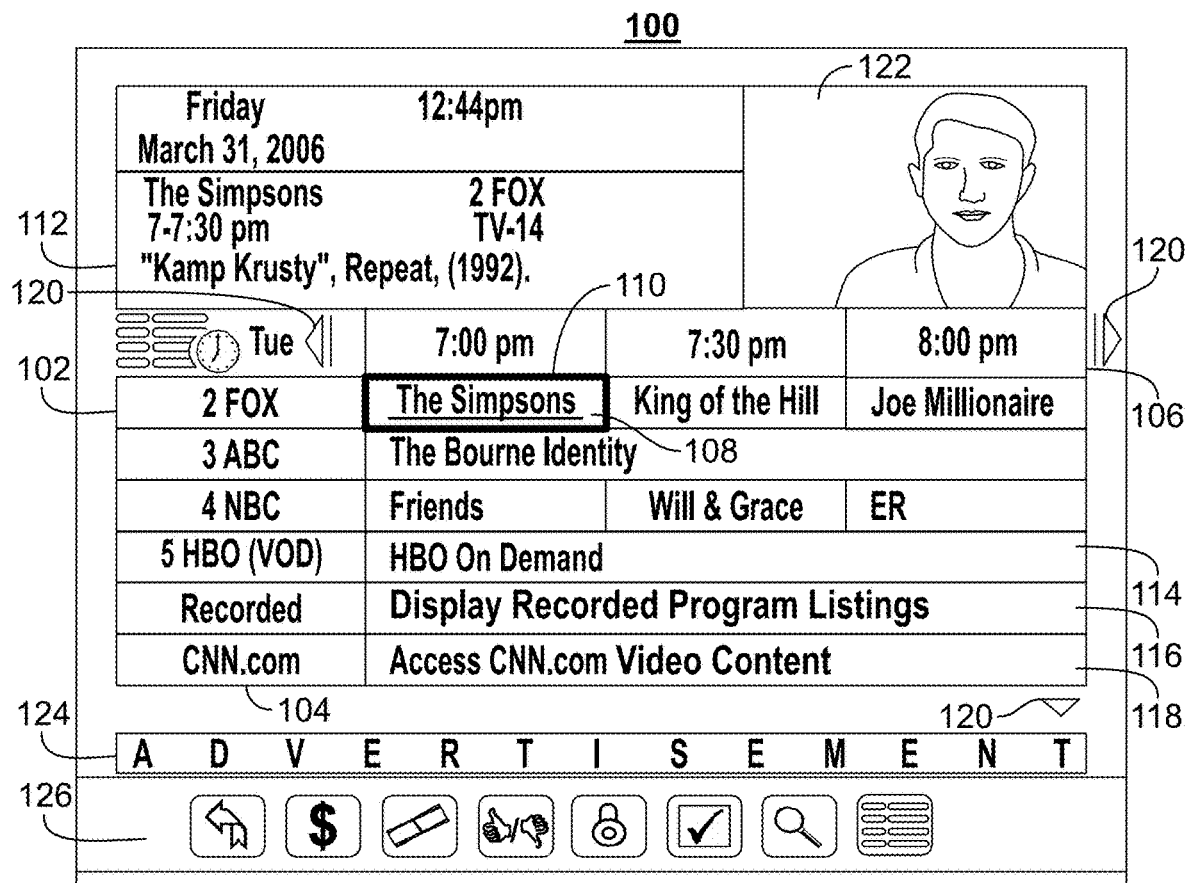
FIGS. 1 and 2 show illustrative display screens that may be used to provide media guidance application listings in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
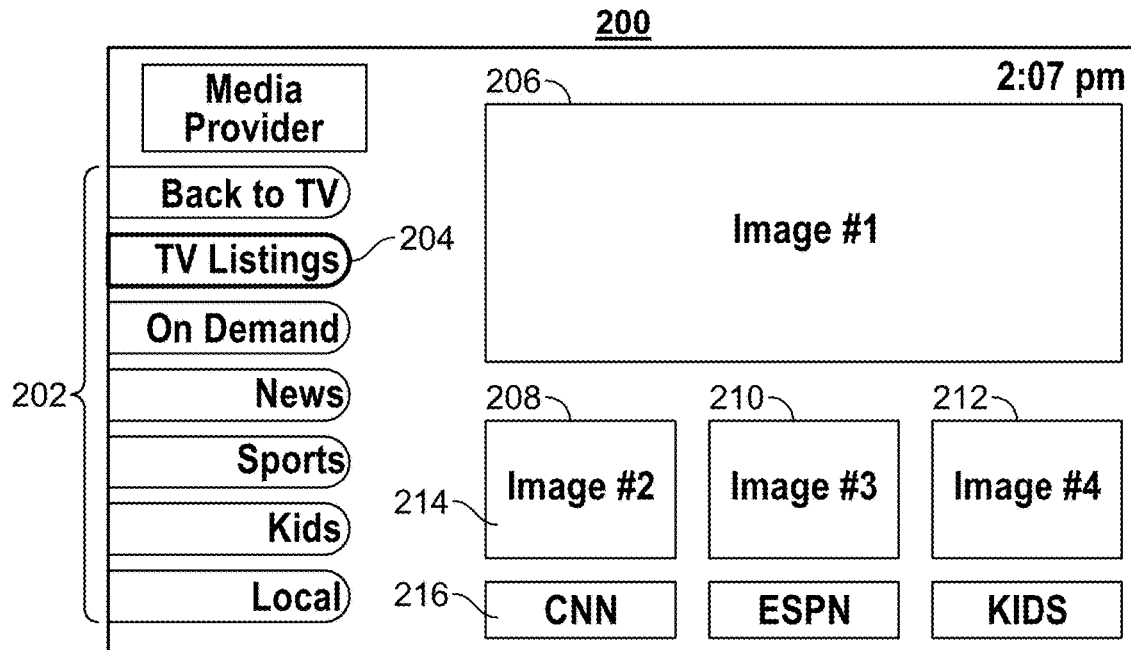

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
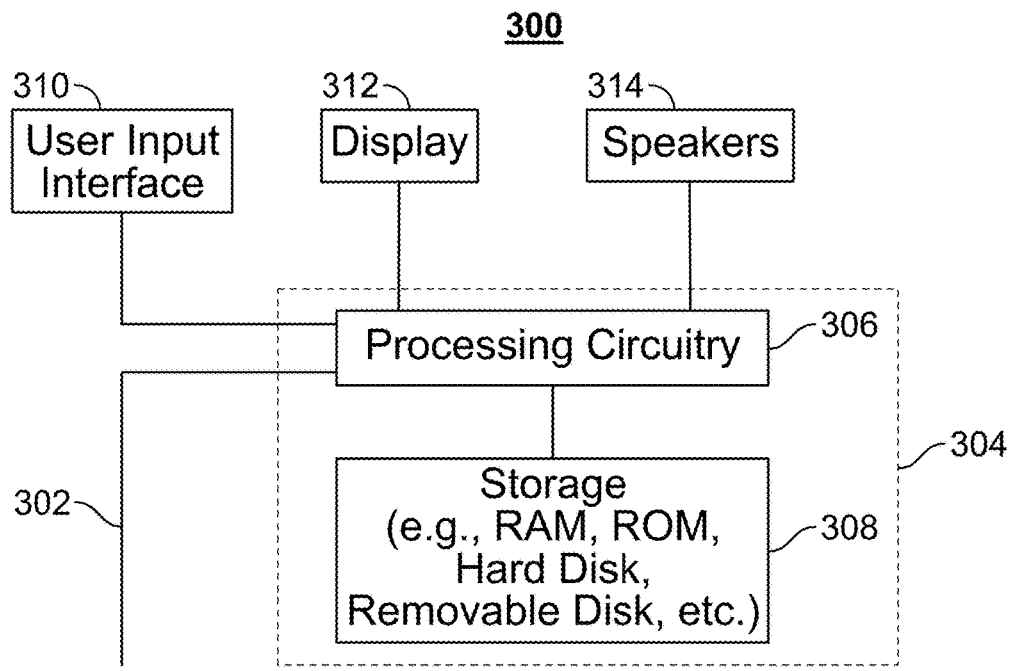
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
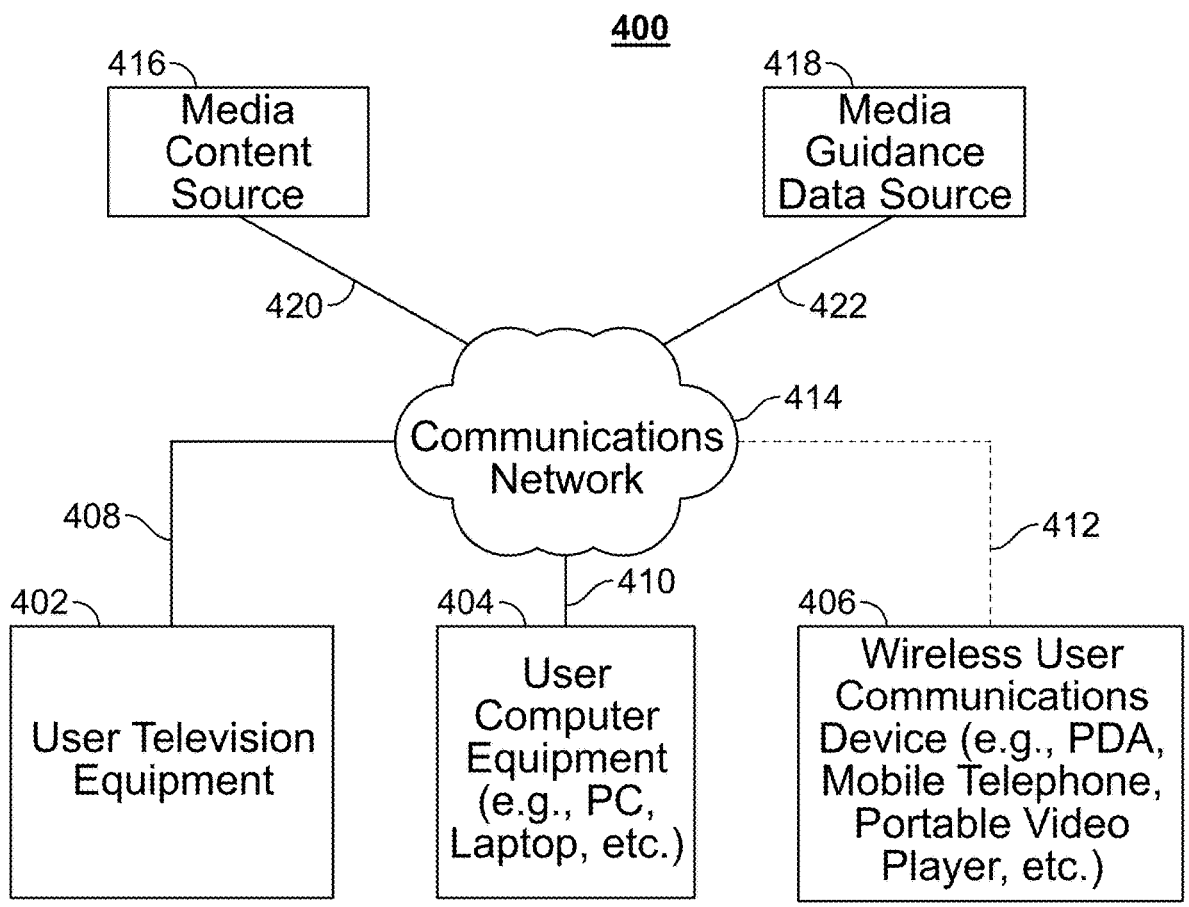
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry 304 of the receiving user equipment to generate the guidance application displays.

In some embodiments, the server application executed by the control circuitry of the remote server may be a context classification application that determines contextual information related to searches performed by a user. The contextual information may include, but need to be limited to, search queries submitted by a user, identifiers assigned to such search queries, and metadata related to search queries. The contextual information may further include user input, submitted in response to previous searches, that confirms or rejects contextual information attributed to the previous searches by the user equipment device.

As part of determining contextual information, the remote server may communicate with one or more other entities, such as speech recognition engine 704 and search engine 708. Speech recognition engine 704 may further communicate with speech recognition database 710, and search engine 708 may further communicate with media asset database 716. The remote server, as part of executing context classification engine 706, may further communicate with knowledge graph 712 and context database 714. For example, the control circuitry of the remote server may assign a first identifier to a first search query based on information retrieved from context database 714. Control circuitry 417 may then assign a second identifier to a second search query received from the user, and determine whether the first search query and the second search query are related based on their relationship in knowledge graph 800.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, a user interacting with a speech recognition system may use an ambiguous expression, such as a negation element, and create an ambiguity as to whether the negation element applies to the current query, or a previous query. When a syntactic analysis of search queries is insufficient, the system relies on contextual information to resolve the ambiguity.

In some embodiments, the system determines a syntactic mapping and a contextual mapping for each query. In some embodiments, an ambiguity is introduced in a latter query, and the system determines a syntactic mapping of the latter query, and a syntactic mapping of a merged query, including the latter query and the preceding query. In an exemplary embodiment, the system determines that the syntactic mapping of the latter query is different from the syntactic mapping of the portion of the merged query corresponding to the latter query. The system accordingly resolves the ambiguity by selecting one of the syntactic mappings, with reference to a syntactic database. For example, resolving the ambiguity with respect to "Show" in the later query "The Today Show" following a query for "Show me," as discussed above. In another exemplary embodiment, the system determines that the syntactic mapping of the latter query is equivalent to the syntactic mapping of the terms of the latter query within the merged query: no additional information is obtained from the syntactic mapping of the merged query. In this exemplary embodiment, the system resolves the syntactic ambiguity by comparing the contextual mappings of the merged query and the latter query, and determining based on stored user information, the contextual mapping which best matches the user's intended meaning.

As referred to herein, the term "syntactic mapping" should be understood to mean a representation of the elements in the query including syntactic identifiers, e.g. logical or grammatical elements determined based on sentence structure, and connections between the syntactic identifiers. Rules for assigning syntactic identifiers and linguistic rules between syntactic identifiers are stored in a syntactic database.

As referred to herein, the term "contextual mapping" should be understood to mean a representation of the contextual identifiers associated with the words or groups of words and connections between the contextual identifiers. Rules for assigning contextual identifiers and rules governing interactions between contextual identifiers are stored in a contextual database, which includes user information, and context identifiers from previous queries.

As referred to herein, the term "syntactically equivalent" should be understood to mean that two queries are syntactically equivalent when any syntactic identifier present in a first query is also present in the second query, i.e. when the syntactic mapping of a first query is equivalent to the syntactic mapping of the second query. Subsets of a query may be syntactically equivalent to another query.

As referred to herein, the term "merged" should be understood to mean juxtaposed with no change in the order of the terms, such that as a merged query resulting from a first query and a second query being merged includes all the terms in the first query, subsequently followed by all the terms in the second query.

As referred to herein, the term "user information" should be understood to mean information stored in a user profile, a user query history, and user speech-to-text preferences or speech patterns, and a contextual database. The term "user information" should be understood to be information relating to the user's intent and meaning in performing queries.

Figure 5:
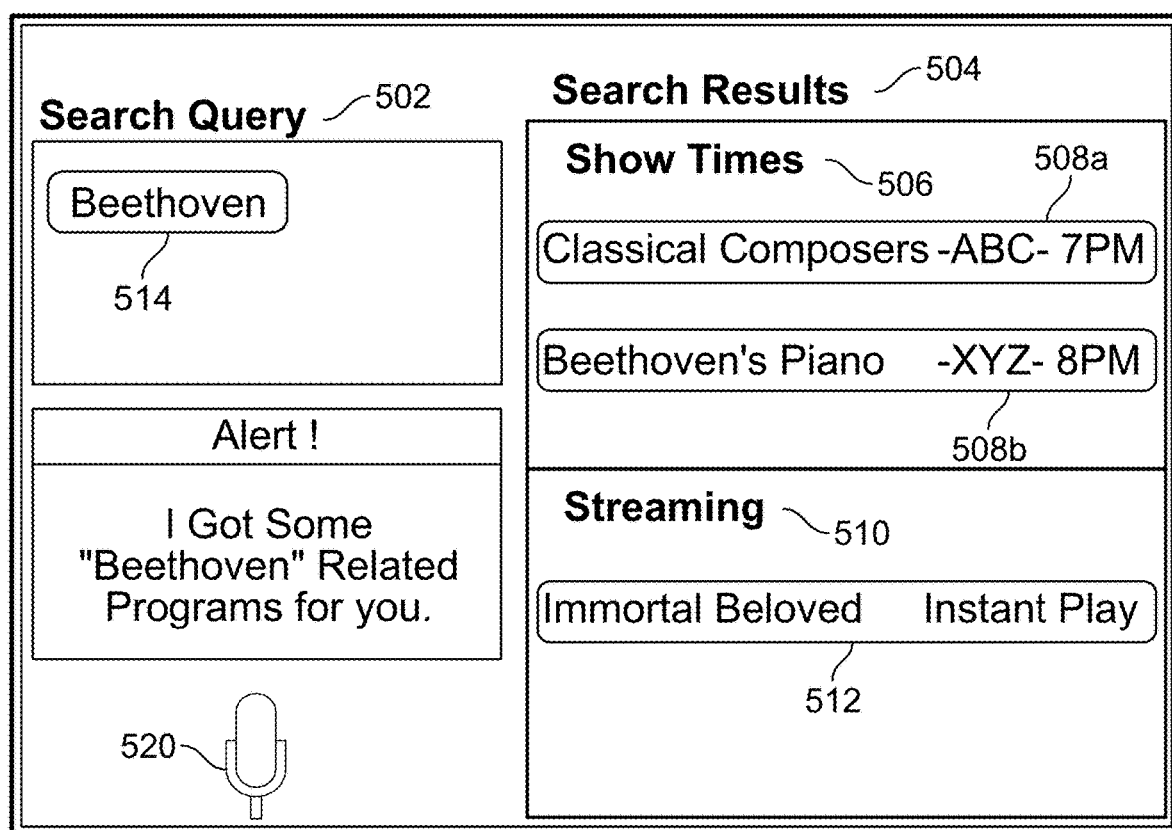
FIG. 5 shows an illustrative graphical user interface that may be used to search for a media asset, in accordance with some embodiments of the disclosure.
Figure 6:
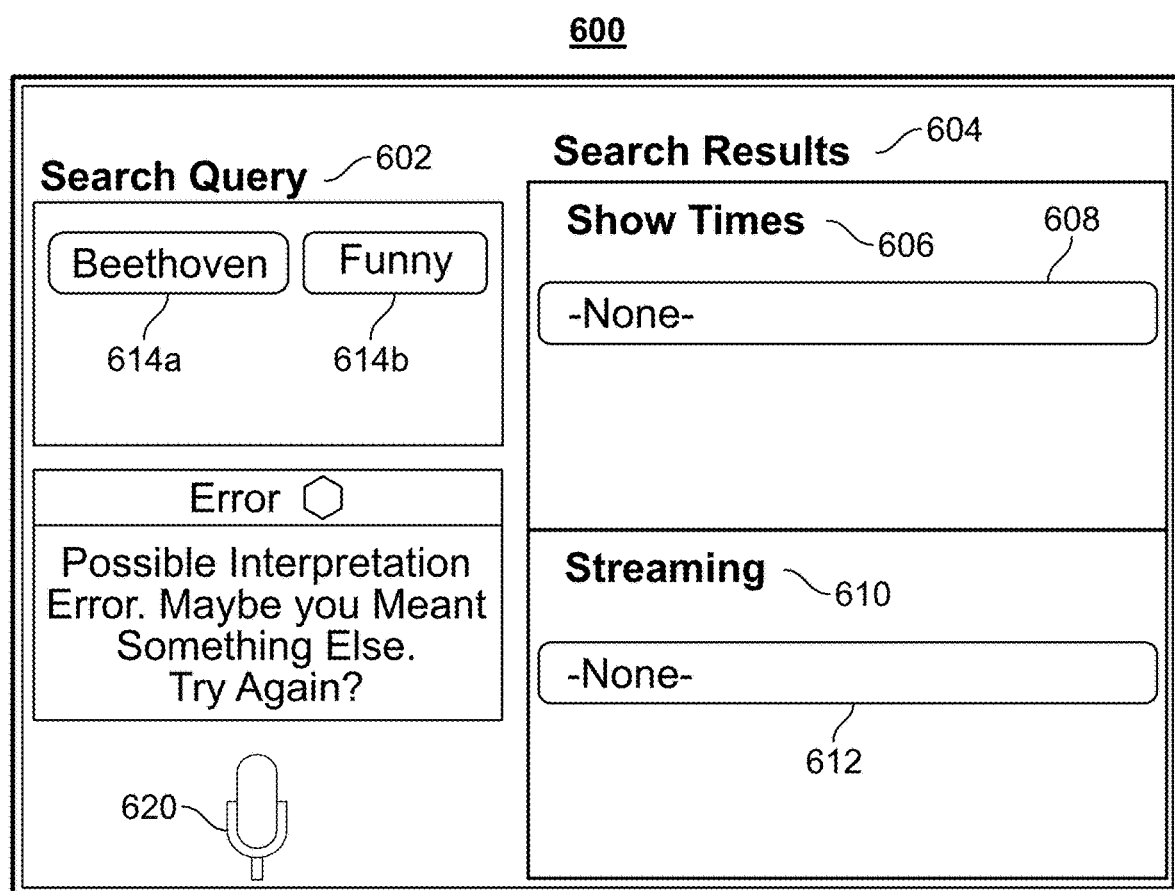
FIG. 6 shows another illustrative graphical user interface that may be used to search for a media asset, in accordance with some embodiments of the disclosure.
Figure 7:
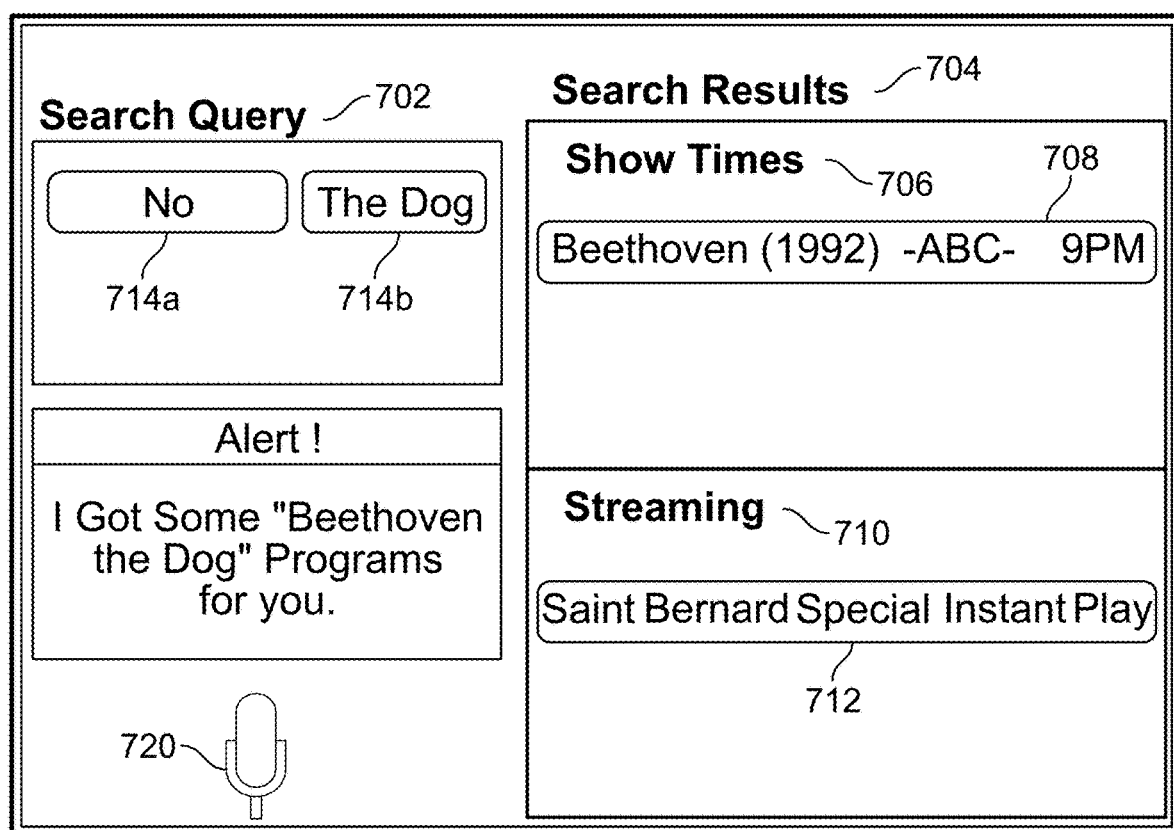
FIG. 7 shows yet another illustrative graphical user interface that may be used to search for a media asset, in accordance with some embodiments of the disclosure.

FIGS. 5-7 show non-limiting embodiments of an illustrative graphical user interface 500 that may be used to search for media assets in according with various embodiments of the present disclosure. In some embodiments, users interacting with automatic speech recognition systems through the illustrative graphical user interface 500, shown in FIGS. 5-7, may create ambiguities in their queries. When there are no query ambiguities, such as shown in FIG. 5, the illustrative graphical user interface 500 displays appropriate search results. When there are query ambiguities, the illustrative graphical user interface 500 may display no results, and displays a notification of a possible interpretation error, as shown in FIG. 6. When a latter query creates an ambiguity, as shown in FIG. 7, the system uses contextual information to resolve the ambiguity, indicates with an alert how it resolved the ambiguity, and displays the appropriate search results.

FIG. 5 shows an illustrative graphical user interface 500 that may be used to search for media assets, in accordance with some embodiments of the present disclosure. When there are no query ambiguities, such as shown in FIG. 5, the illustrative graphical user interface 500 displays appropriate search results. As discussed in relation to FIG. 3, control circuitry 304 of user equipment device 300 may generate for display on display 312 graphical user interface 500 in response to receiving a request from the user to perform a search. Graphical user interface 500 may include a search query window 502 and a search result window 504. Search result window 504 may be split into several segments, according to the type of content displayed in the window. For example, search result window 504 may contain a show times window 506, corresponding to media assets that are transmitted on broadcast channels, and a streaming window, corresponding to media assets that can be streamed from a remote server or other form of storage medium.

In some embodiments, control circuitry 304 updates graphical user interface 500 in response to receiving voice input from the user. Voice input indicator 520 may be used to facilitate the interaction between graphical user interface 500 and the user. For example, control circuitry 304 may generate for display voice input indicator 520 to alert the user that voice commands may be used as input. Control circuitry 304 may then receive a command that indicates that a voice command is about to be issued by the user, for example, by pressing a button on a remote control, touching the screen at a substantially similar position as voice input indicator 520, or by using other suitable means. The input may also correspond to a control command spoken by a user, such as "Command" or a similar input. Upon receiving such user input, control circuitry 304 may receive voice data that is processed using automatic speech recognition techniques and translated to text format, such as a text string, that can be more easily processed further by control circuitry 304.

In some embodiments, control circuitry 304 may receive a search command from the user that includes a first search query. In response to receiving the search command, control circuitry 304 may cause graphical user interface 500 to display a search query window 502 that includes a textual representation of the search query (e.g., search query 514, a search for media assets related to "Beethoven").

In the example shown in FIG. 5, a user can say "show me some Beethoven movies," resulting in a speech-to-text conversion, and analysis of the query "show me some Beethoven movies" by the control circuitry. For example, control circuitry 304 determines a syntactic interpretation of the user input. In some examples, a syntactic interpretation of a user input may be based on grammatical analysis, by parsing the query into "show me," "Beethoven" and "movies," all identified as different syntactic components of a sentence. The control circuitry 304 may also determine that "Beethoven" is the keyword for the search. In addition, control circuitry 304 may abbreviate the search query in order to present it to the user in more compact form, such as by displaying the text "Beethoven" instead of "show me some Beethoven movies" or a similar form of search query.

In the example shown in FIG. 5, control circuitry 304 can display an alert to the user, indicating that the control circuitry has identified "Beethoven" as the key term in the user query. In this example, control circuitry 304 displays the message "I got some Beethoven related programs for you" to the user.

In some embodiments, control circuitry 304 may perform a search for media assets that match search query 514 received from the user. Various types of media assets, such as broadcast programs or media assets available on-demand, may be searched and displayed in search results window 504 of graphical user interface 500. Media assets that are identified by control circuitry 304 as matching search query 502 may also be grouped according to their type, such as by showing broadcast programs 508a and 508b in show time segment 506 and media assets that are available on-demand 512 in streaming segment 510.

In the example shown in FIG. 5, the control circuitry 304 returns search results related to the classical composer Beethoven, with upcoming broadcasts such as "Classical Composers" on ABC at 7 pm, and "Beethoven's piano" on another channel at 8 pm. The control circuitry may also display other media available to the user through different means, such as streaming segment 512 "Immortal Beloved" available through instant play.

Although not shown in FIG. 5 to avoid overcomplicating the drawing, control circuitry 304 may generate for display additional media type segments, such as for media assets stored locally on a hard disk, or other suitable types of media assets.

In some aspects, control circuitry 304 may automatically perform a search as soon as search query 514 is received from the user. In this example, the control circuitry may automatically perform a search based on the syntactic analysis performed on the search query. For example, the control circuitry 304 may determine that "Beethoven" is the keyword. Control circuitry 304 can further determine that "Beethoven" refers more specifically to a title, rather than an actor or a genre. In other embodiments, the control circuitry 304 can further analyze the query through a contextual analysis. In the example shown in FIG. 5, the control circuitry 304 has provided search results associated with the classical pianist Beethoven. In this example, a contextual mapping may be accessed, indicating that in general "Beethoven" queries relate to the musician. In addition to or in combination with accessing a general contextual database, the control circuitry 304 can also access information specific to the user, e.g. the user's musical preferences, the user's previous search history, or the user's age. In some examples, the user information may be either automatically gathered from the user or manually inputted by the user. In other embodiments, control circuitry 304 may not perform a search for media assets matching search query 514 until an explicit search command is received from the user.

FIG. 6 shows another illustrative graphical user interface 600 that may be used to search for media assets, in accordance with some embodiments of the present disclosure.

When there are query ambiguities, the illustrative graphical user interface 500 may display no results, and display a notification of a possible interpretation error, as shown in FIG. 6.

Voice input indicator 520 may be used to facilitate the interaction between graphical user interface 600 and the user. For example, control circuitry 304 may generate for display voice input indicator 620 to alert the user that voice commands may be used as input. Subsequent to receiving search query 514 (indicated as query 614a) and possibly performing a search based on search query 514, control circuitry 304 may receive a second search query 614b from the user.

For example, subsequent to the search query indicated as 614a "Beethoven," the control circuitry 304 may receive a second speech-to-text input such as "those funny videos." The control circuitry 304 may similarly parse this second query "the funny videos" using syntactic classification engine 905, to provide a first syntactic mapping of the second query, identifying "funny" as the keyword and "videos" as the type of media requested. Control circuitry 304 may also determine that "funny" refers to a genre. Control circuitry may determine a contextual mapping of the query and its keyword "funny," in the context of the conversation, and in some examples, taking into account user preferences.

Figure 8:
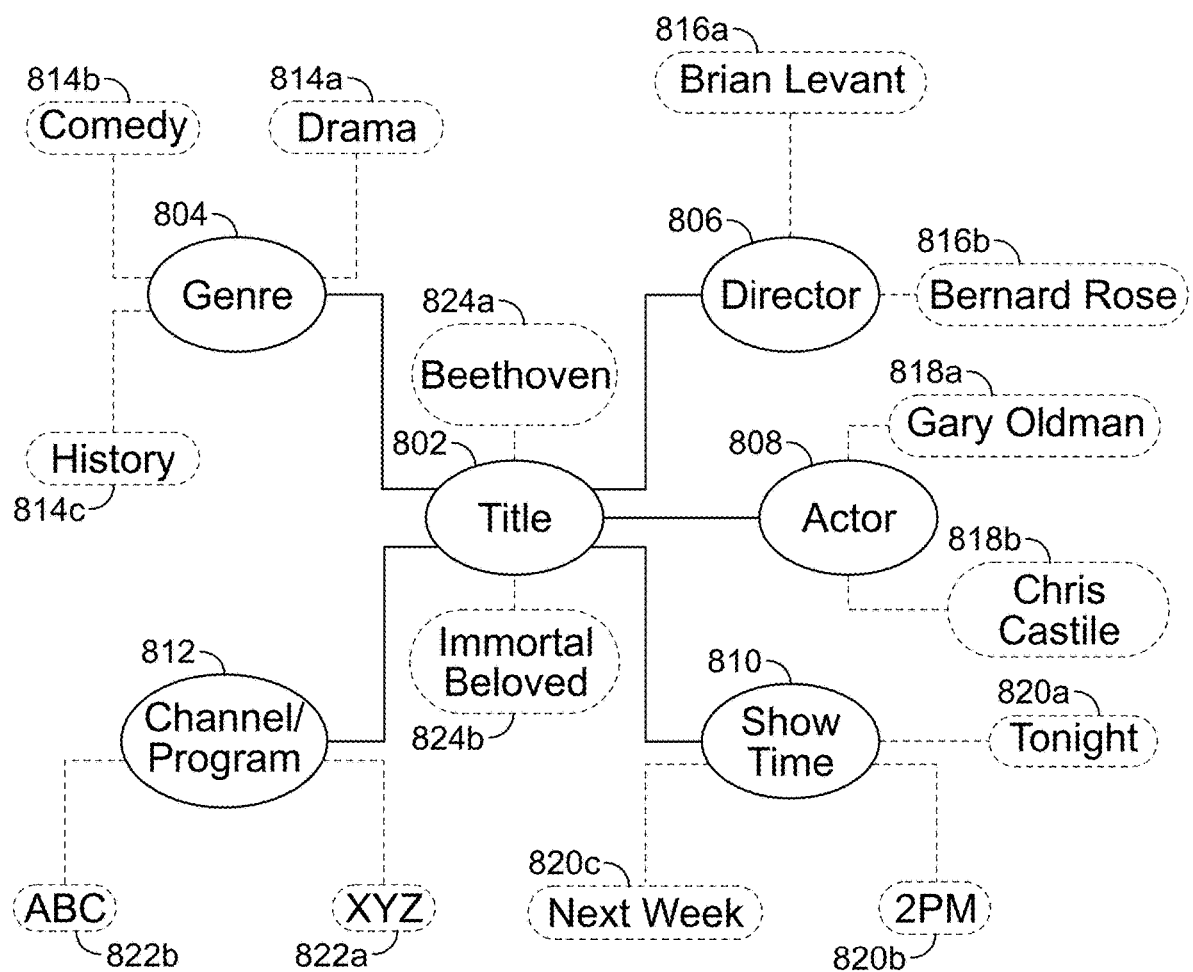
FIG. 8 shows a knowledge graph that illustrates contextual information used for searching for media assets, in accordance with some embodiments of the disclosure.

Control circuitry 304 also stores the syntactic and contextual information that was present prior to the query in mappings such as described with respect to FIG. 8. The syntactic mapping may connect logical, grammatical identifiers by reference to a syntactic database, such as syntactic database 911, which may be stored on storage 308, while the contextual mapping may connect context identifiers related to the queries in a context database. In some examples, the knowledge graph and the contextual database can be adapted or updated to reflect the user's speech pattern, searching preferences, or overall interests.

For example, the control circuitry 304 may determine that the user is a classical music lover, with the search for "Beethoven" producing the results shown in FIG. 6, related to classical music. Subsequent to receiving the new query "the funny videos," interpreted as "funny" the control circuitry creates a subset of media assets matching both "Beethoven" from the first query and "funny" from the second query. In some example, for a user having no classical music connections, the control circuitry 304 may determine that there are several Beethoven the dog movies, or Beethoven spoofs in the subset of "Beethoven" and "funny". However, as shown in the example of FIG. 6, for a user determined to be more interested in classical music rather than comedies, the control circuitry may detect a possible interpretation error.

In the example shown in FIG. 6, control circuitry 304 accesses the context database 914, and may compute a weak classification score for entity "funny" in connection with "Beethoven" or may not be able to classify it at all. Accordingly, as shown in FIG. 6 returns a potential interpretation error message to the user, "Possible interpretation error. Maybe you meant something else. Try again?" The user may then provide additional input to confirm, modify or reject the previous search queries.

As shown in FIG. 6, control circuitry 304 displayed no relevant search results matching the subsequent search query based on its syntactic and contextual interpretation of the queries. In alternative embodiments, control circuitry 304 may be limited to either the syntactic mapping or the contextual mapping, or use a combination of both to provide the user with search results.

Various types of media assets, such as broadcast programs or media assets available on-demand, may be searched and displayed in search results window 604 of graphical user interface 600. Media assets that are identified by control circuitry 304 as matching search query 602 may also be grouped according to their type, such as by showing broadcast programs 608 in show time segment 606 and media assets that are available on-demand 612 in streaming segment 610.

In alternative embodiments, the control circuitry 304 can detect automatic speech recognition errors. For example, instead of "funny" as shown in FIG. 6, the user may have said "furry" or "fugue." In the context of an ASR error, the control circuitry 304 may also display an alert or error message, such as "I didn't get that," "I'm not sure what you said," or "speech recognition error." In the example involving a speech-to-text recognition error, the control circuitry 304, as it does in the case of a possible interpretation error, can also ask for clarification from the user.

Clarification may be in the form of additional input "I meant" "fugue," or in the form of a display of speech-to-text recognition options, requesting the user to select the appropriate one. Similarly, in the case of an interpretation error, the user may be prompted for further clarification, or may select one of several listed options such as "classical music" or "comedies." In some examples, the control circuitry 304 may make a determination about the user's second query, i.e. decide whether the user meant "funny" or "furry," by referring to the stored syntactic mapping obtained by syntactic classification engine 905, and continuing the conversation based on this assumption. Based on the context stored, control circuitry 304 may interpret and answer the new queries despite the intermediate query that contained the speech-to-text ambiguity.

Similarly, the control circuitry 304 may make a determination about the user's second query, i.e. decide whether the user meant "funny" in the context of Beethoven the dog, or meant "fugue" in the context of Beethoven's classical music. In these examples, by making an assumption about the user input in query 614b, the control circuitry 304 allows the user to continue the conversation with further queries without any interruption, providing the user with a more natural conversational setting. Based on the context stored, control circuitry 304 may interpret and answer the new queries despite the intermediate query that contained the interpretation ambiguity. As described in relation to FIG. 7, an interpretation ambiguity can be resolved in a manner transparent to the user, by referring to stored contextual information.

FIG. 7 shows another illustrative graphical user interface 700 that may be used to search for media assets, in accordance with some embodiments of the present disclosure.

When a latter query creates an ambiguity, the system uses contextual information to resolve the ambiguity, indicates with an alert how it resolved the ambiguity, and displays the appropriate search results, as shown in FIG. 7

Voice input indicator 520 may be used to facilitate the interaction between graphical user interface 700 and the user. For example, control circuitry 304 may generate for display voice input indicator 720 to alert the user that voice commands may be used as input. Subsequent to receiving search query 614b, control circuitry receives additional queries. In the example discussed in FIG. 6, if the control circuitry proceeded to interpret query 614b to say "fugue" based on the user's history and preferences, as stored in the contextual database, the control circuitry 304 displayed search results shown in FIG. 6, associated with the classical composer. However, if the user in fact said "funny," following a sudden urge to watch comedies, and is dissatisfied with the search results presented in search results window, for example as shown in FIG. 5, the user may want to correct these results.

Accordingly, as shown in FIG. 7, control circuitry 304 subsequently receives another query 714 in the form of speech-to-text input including "No, the dog," indicating that the user does not want classical related results, but rather results associated with Beethoven the dog. Control circuitry 304 may parse the speech-to-text input into logical elements "No" and "Dog." Control circuitry 304 may retrieve the earlier context of search results with movies for entity "Beethoven" from knowledge graph 800. Control circuitry 304 may retrieve a subset of search results 704 corresponding to entity "Beethoven the dog" along with a message, "I got some Beethoven the dog programs for you." As shown in FIG. 7, search results in window 704 now display search results associated with Beethoven the dog, such as the movie Beethoven from 1992, or a related Saint Bernard Special available on instant play. Various types of media assets, such as broadcast programs or media assets available on-demand, may be searched and displayed in search results window 704 of graphical user interface 700.

Media assets that are identified by control circuitry 304 as matching search query 702 may also be grouped according to their type, such as by showing broadcast programs 708 in show time segment 706 and media assets that are available on-demand 712 in streaming segment 710.

In the example shown in FIG. 7, after control circuitry 304 determines, through syntactic classification engine 905 and its associated syntactic database 911, stored in storage 308, a syntactic mapping for the search query to include the elements "No" (search query element 714a) and "the dog" (search query element 714b), the control circuitry detects an ambiguity in the logical operator "No." Based on a syntactic mapping of the later query "No the dog" (query elements 714a and 714b) and a syntactic mapping of a merged query "Beethoven. No, the dog" it may be unclear whether the user intended to exclude prior search results (classical Beethoven media assets), or meant to clarify that they did not want to see results associated with a dog. In the first instance, the logical operator "No" would be applied by control circuitry 304 to the first search query 614a, the resulting search results, or a combination of both. In the latter case, the logical operator "No" would be applied by control circuitry 304 to the later search query term 714b "the dog." In the example shown in FIG. 7, the control circuitry 304 resolves the ambiguity created by the query element 714a "No" by assigning the logical modifier to search results previously obtained after the first query 614a "Beethoven". Accordingly, as discussed above, the search results displayed in window 704 relate to Beethoven the dog.

In an alternative embodiment, control circuitry 304 resolves the ambiguity by assigning the ambiguous negation element 714a "No" to the later query term 714b "The dog" and would update previous search results to specifically exclude dog related results. In an alternative example of the embodiment shown in FIG. 7, a first query could be "Action," followed by a second query "No Tom Cruise," where the user is requesting action movies without Tom Cruise. In this example, after control circuitry 304 determines a syntactic mapping for the search query to include the elements "No" and "Tom Cruise", the control circuitry detects an ambiguity in the logical operator "No." Based on a syntactic mapping of the later query "No Tom Cruise" and a syntactic mapping of a merged query "Action. No Tom Cruise" it may be unclear whether the user intended to exclude prior search results (no action movies), or meant to refine their search to action movies without Tom Cruise. As discussed above control circuitry 304 may rely on contextual mappings of the query to resolve the ambiguity. As discussed above control circuitry 304 may rely on contextual mappings of the query, including information on the user's pattern of speech or prior query history, to resolve the ambiguity. In this example, control circuitry may correctly determine that the "No" should be assigned to the entity in the second query "Tom Cruise."

In alternative embodiments, an ambiguity is created by a negation element such as "No," "Not," or equivalent negation expressions "don't." "Nope," "Wrong," etc. In alternative embodiments, an ambiguity is created by a pause created by the user, either at a specific time, or for a certain duration over a threshold duration.

For example, if a user pauses for more than 5 seconds, or if a short pause is followed by "Now, . . . " In alternative embodiments, the user may make sounds, sigh or grunt such as "Hmmm..", "Hmph..," "Blah," "Meh," etc. These sounds or indicators may be correctly detected by control circuitry 304 and displayed as speech-to-text entries, but may create an ambiguity as to whether the user is dissatisfied with previous search results, unsure of what his next query should be, or trying to clarify his intent.

An ambiguity such as those discussed above, with respect to a negation element, a pause, a sound, or any other ambiguous queries, is detected by control circuitry 304 when comparing syntactic mappings of various queries leaves control circuitry 304 unable to select between alternatives.

In the example shown in FIG. 7 where control circuitry 304 correctly detected the user's intent to watch Beethoven the dog, the ambiguous negation term, query element 714a "No" was correctly applied to the previously returned search results.

In an exemplary embodiment, control circuitry 304 determines a syntactic mapping of the query "No the dog," and also determines a syntactic mapping of a merged query, comprising the earlier query element 614a "Beethoven," resulting in a merged query "Beethoven. No, the dog." In this example, the syntactic mappings for the "No, the dog" query and the portion of the merged query corresponding to the terms of the second query are syntactically equivalent. Nothing in the syntactic mappings assigns the ambiguous negation element, or ambiguous element in general, to either "Beethoven" or "the dog," i.e. no additional information is gained by performing the syntactic mapping of the merged query. For example, the second query "No, the dog" and the merged query "Show me some Beethoven movies. No, the dog," may have identical syntactic identifiers corresponding to the terms "No, the dog." For example, a syntactic mapping of the second query "No, the dog," may assign syntactic identifiers "negation" and "noun," to "No" and "dog," respectively. A syntactic mapping of the merged query may assign identifiers "verb" "user" "Object" and "object modifier" to the terms "Show" "me" "Beethoven" and "movies," respectively, based on the sentence structure. However, the syntactic identifiers of the terms of the merged query corresponding to the second query may be the same for the merged query and the second query, i.e. "Negation" and "Noun." In this example, there is no alternative identifier for "no" or for "the dog," provided by performing a syntactic mapping of the merged query. This lack of additional information obtained by the syntactic mapping of the merged query in this example is in contrast to additional information gained with respect to the "Show me" "the Today show" queries discussed above. Alternative ambiguous elements beside negation elements may also be pronouns or elements referencing other terms in the query, such as "It," "that," etc.

In an alternative example, some ambiguities between queries may be resolved based on syntactic mappings alone. For example, if a first user query is "Show me" and a second user query is "The Today Show" a syntactic mapping of the merged query will correctly determine that "Show" in "the today show" is different from the action verb "Show" in the first query, based on the typical sentence structure displayed by the merged query. Accordingly, the system can display to the user media assets associated with "the today show." In this example, the system may detect an ambiguity in the term "Show" in the second query, with respect to whether "show" was intended by the user as an action verb, or a noun. A syntactic mapping of "The today show" may include "The" "Today" and "Show," with these terms recognized in relation to a syntactic database 911, stored on storage 308, as being an identifier, a noun, and a verb, respectively. A syntactic mapping of "Show me the today show" may lead to a syntactic mapping with the terms "Show" "me" "the" "today" "show", which may be recognized as a verb-object sentence structure, with the verb "Show" introducing a request for an item for "me," such that the terms "the today show" are logically interpreted to be the object of the request. In this example, the syntactic mapping of the terms of the merged query corresponding to the second query, i.e. "The today show" would be an identifier representing a noun or a target for the group of words "The today show." In this example, the syntactic mapping of the terms of the merged query corresponding to the second query is different from the syntactic mapping of the second query, which included identifiers for a noun and a verb ("Today" and "Show"). With reference to a stored syntactic database 911, stored on storage 308, the system can recognize that the verb-object structure is more common than the structure noun-verb, and accordingly select the syntactic interpretation obtained with the merged query, to show the user videos of "The today show." In another example, the stored syntactic database on storage 308 may provide information specific to a language, e.g. American English, which may have different sentence structures from British English.

FIG. 8 shows a knowledge graph 800 that represents contextual information used for searching for a media asset, in accordance with some embodiments of the disclosure. Knowledge graph 800 may include a possibly large number of entities that are represented as nodes in the graph. For example, knowledge graph 800 may contain, among others, nodes 802, 804, 806, 808, 810, and 812. The nodes of knowledge graph 800 may be connected by edges, and the presence of an edge in the graph may represent that there is an association between the entities represented by the nodes in the graph. For example, the edge connecting node 802 (i.e., "title") with node 808 (i.e., "actor") may illustrate the availability of contextual information between a media asset's title and actors featured in the media asset. In some implementations, an edge in knowledge graph 800 denotes that an association between the two entities connected by the edge is present. Conversely, the absence of an edge in knowledge graph 800 between two entities may denote that no association exists. For example, nodes 802 and 804 may be connected by an edge, illustrating possible search results when a search query related to a genre of a media asset is followed by a subsequent search query related to a title of a media asset within the queried genre. For example, control circuitry 304 may determine, based on the presence of an edge between nodes 802 and 804, possible search results for a search query related to a genre of a media asset, e.g., "comedy" followed by a subsequent search query related to a title of a comedy, e.g., "Beethoven."

In some aspects, knowledge graph 800 may include nodes of various degrees. For example, knowledge graph 800 may include nodes of a first degree, such as nodes 802-812, and nodes of a second degree, such as nodes 814-822. Nodes of a first degree may correspond to broad categories, such as "actor," "genre," "producer," "title," "show time," and "channel/program." Nodes of a second degree may correspond to terms with a more narrow meaning, such as specific instances that fall under the broad categories represented by the first degree nodes. For example, "title" node 802 may be connected with node 824a ("Beethoven") and node 824b ("Immortal Beloved"). Node 802 may be connected with many more nodes, even though only nodes 824*a* and 824*b* are shown in FIG. 8 to avoid overcomplicating the drawing. Similarly, "actor" node 808 may be connected with node 818*a* ("Gary Oldman"), node 818*b* ("Bernard Rose"), and other nodes (not shown). In some embodiments, each of the second degree nodes may be connected to only a single first degree node, which may result in a structured graph that is more easily traversed by control circuitry 304 when a search needs to be performed. Alternatively, second degree nodes may be connected to more than a single first degree node, e.g., to accommodate cases in which the concept represented by the second degree may need to be associated with more than a single first degree node (e.g., a person who is both an actor and a producer).

Figure 9:
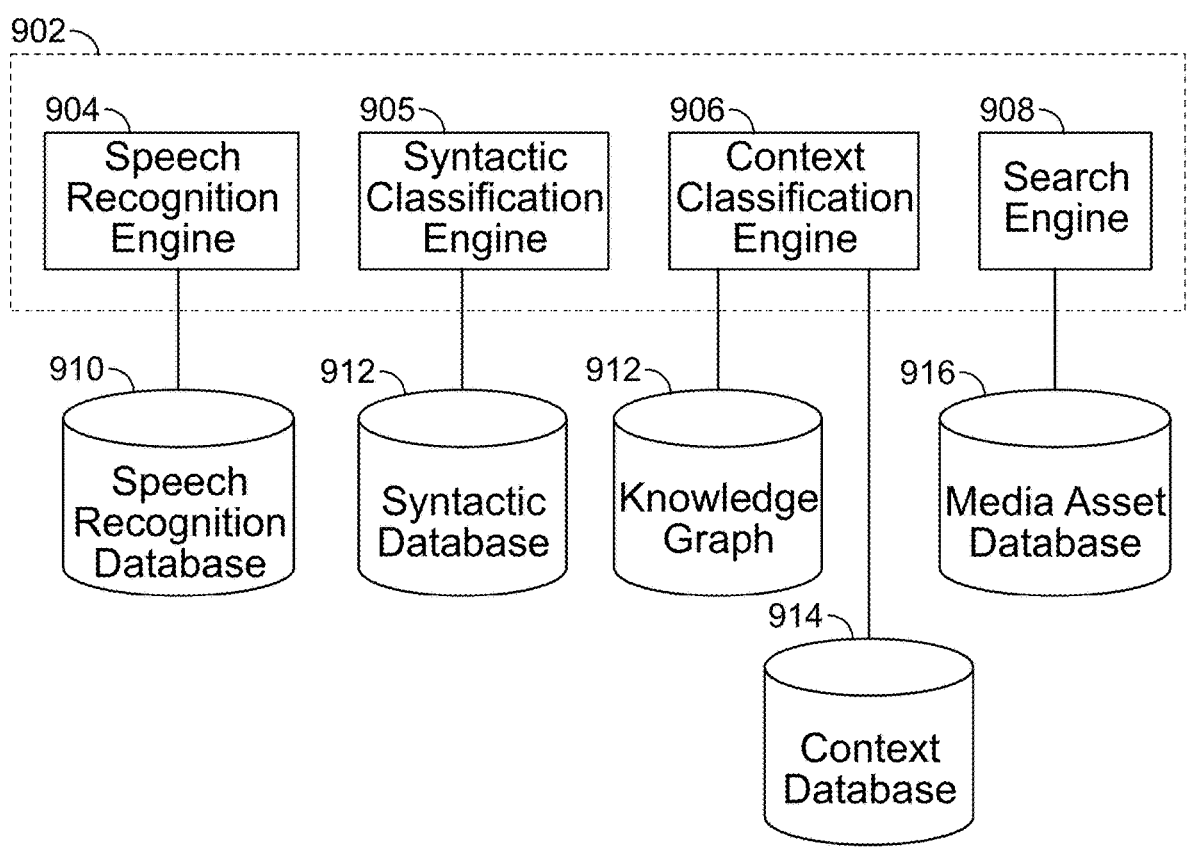
FIG. 9 is an illustrative block diagram of an interactive media system for searching for a media asset, in accordance with some embodiments of the disclosure.

FIG. 9 is an illustrative block diagram 900 of an interactive media system 900 for searching for a media asset, in accordance with some embodiments of the disclosure. Interactive media system 900 may comprise several components that are located on remote server 902. Remote server 902 may be a remote server including control circuitry as shown in relation to FIG. 4. In some embodiments, remote server 702 may host several components to perform automatic speech recognition, grammatically parse received input, classify contextual information related received input, and perform a search. For example, remote server 902 may include speech recognition engine 904, syntactic classification engine 905, context classification engine 906, and search engine 908. As referred to herein, operations performed by speech recognition engine 904, context classification engine 906, and search engine 908 should be understood to mean operations that are executed by control circuitry. For example, speech recognition engine 904 may be installed on remote server 902 or 415 as a piece of software code. The control circuitry may then execute the software corresponding to speech recognition engine 904 to carry out the functionality assigned to speech recognition engine 904 (e.g., to perform automatic speech recognition of speech input).

Speech recognition engine 904 may be an application that receives a speech segment as input (e.g., in form of an audio file or a similar digital representation) and generates a text string as output that captures the content of the speech segment. In some embodiments, speech recognition engine may receive the speech segment from remote server 902, which in turn may receive the speech segment from control circuitry 304. In some embodiments, speech recognition engine 904 may be connected to speech recognition database 910 that stores the vocabulary of a language spoken by a user (e.g., English). Speech recognition database 910 may further include a vocabulary of reserved words that represent commands available to the user. For example, the word "Command" may be reserved and represent the beginning of a command that is available to the user. For example, the word "Command" followed by "Search" may indicate that the user intends to perform a search of media assets.

Syntactic classification engine 905 may be responsible for parsing queries and assigning logical identifiers to elements of the query, based on the grammatical structure of the query. In some embodiments, syntactic classification engine may first identify nouns, verbs and adjectives, or pronouns, contractions and punctuation, as identified by pauses between certain query terms. For example, syntactic classification engine 905 may determine that "Don't do that, it's annoying," includes negation element "Don't," includes references to other elements "that" and "it," and characterizes what is referenced by the elements as "annoying."

Syntactic classification engine may contain rules. For example, one rule may specify when articles, such as "the" and "a" may be "deleted." Another rule may specify words that should be removed because they are clear from context. For instance, the search query "media asset Beethoven" may be reduced to "Beethoven," because it may be clear from context that any search pertains to media assets. Syntactic database 911, stored on storage 308, may also contain rules that may be used by syntactic classification engine to provide an accurate grammatical or syntactic parsing of terms, based on linguistic rules or linguistic heuristics.

Context classification engine 906 may be responsible for assigning identifiers to search queries received from speech recognition engine 904. In some embodiments, context classification engine 906 may first identify keywords or patterns associated with the search queries, for example, by using context database 914, stored on storage 308. Context database 914 may contain listings of keywords or associations that frequently occur in search for media assets.

Context database 914, stored on storage 308, may also contain rules that may be used by context classification engine 906 to extract keywords or relationships from the search queries.

In response to identifying keywords based on the received search query, context classification engine 906 may assign an identifier to the search query. Context classification engine 906 may select the identifier based on the search query from a predefined set of candidate identifiers. The identifiers included in the candidate set may have a varying degree of specificity. For example, in a first embodiment, the set of identifiers may only include first degree nodes in knowledge graph 800, as is discussed in relation to FIG. 8. These identifiers may include "actor," "genre," "channel/program," "title," "producer," and "show time." Other suitable identifiers that are typically included in media asset metadata may also be included. Context classification engine 906 may assign such relatively broad terms because these terms may provide appropriate contextual information based on which the search query is issued.

For instance, if a user is looking for media assets that feature the title "Beethoven," then the identifier "comedy" may broadly capture the context within which the user has issued the search query. Similarly, if control circuitry 304 receives a command from the user to search for media assets with a start time in the evening (e.g., in response to receiving a search query "what's on this evening"), the identifier "start time" may broadly capture the context of the search.

In a second embodiment, identifiers assigned to the search query may be associated with a larger degree of specificity. For instance, the identifiers may be substantially similar to the keywords that are being extracted by control circuitry 304 from speech data provided by the user. For example, in response to receiving the search query "what's on tonight," control circuitry 304 may assign the identifier "tonight" instead of "start time." In another example, if control circuitry receives the search query "show me a Beethoven movie," control circuitry 304 may assign the identifier "title" rather than "actor". The larger degree of specificity associated with this second exemplary embodiment may provide more accurate contextual information, at the expense of failing to make associations that could be made in the case of using broader identifiers.

In a third embodiment, identifiers assigned to the search query may be associated with links to other identifiers, and indications of typical placement in a sentence or conversation, in relation to other identifiers. For example, an identifier associated with dissatisfaction for "Hmph" may be connected to an identifier for uncertainty such as "Maybe." Identifiers may provide information and links related to the user's intent, based on previously stored information, general to a population, or specific to a user. In this example, context database 914 may include a mapping of contextual relationships between different contextual identifiers, stored on storage 308. Once one or more identifiers are associated with the query terms, connections to other identifiers may be analyzed. For example, the mapping of contextual relationships present in context database 914, stored on storage 308, may include a connection between a pause and a negation identifier.

Context classification engine 906 may further be connected to knowledge graph database 912. Upon assigning an identifier to the search query received from speech recognition engine 904, context classification engine may access knowledge graph database 912 to determine if a node exists in knowledge graph 800 that corresponds to the identifier. If such a node exists, context classification engine 906 may next identify other identifiers from knowledge graph database 912 that are related to the identifier, e.g., by considering all the edges that connected to the node corresponding to the identifier. Next, context classification engine 906 may perform processing for each of the related nodes determined from the knowledge graph. The further processing may include adding the current identifier to a candidate set of identifiers.

In some embodiments, upon receiving a second search query, context classification engine 906 may assign a second identifier to the second search query. Context classification engine 906 may then determine whether the second identifier is contained in the set of candidate identifiers. If context classification engine 906 determines that the second identifier is contained in the set, context classification engine 906 may determine that the first search query and the second search query are related. Alternatively, if the second identifier is not contained in the candidate set, context classification engine 906 may determine that the first search query and the second search query are not related.

Search engine 908 may be responsible for searching a plurality of media assets based on one or more search queries. In some embodiments, search engine 908 may be connected to media asset database 916 that contains media assets, metadata associated with media assets, and other information suitable for locating a media asset among the plurality of media assets based on search queries. Search engine 908 may receive a number of search queries as input, and provide a plurality of media asset listings as output. Control circuitry 304 may generate a display of the plurality of media asset listings in graphical user interface 500, as is discussed in relation to FIG. 5.

Figure 10A:
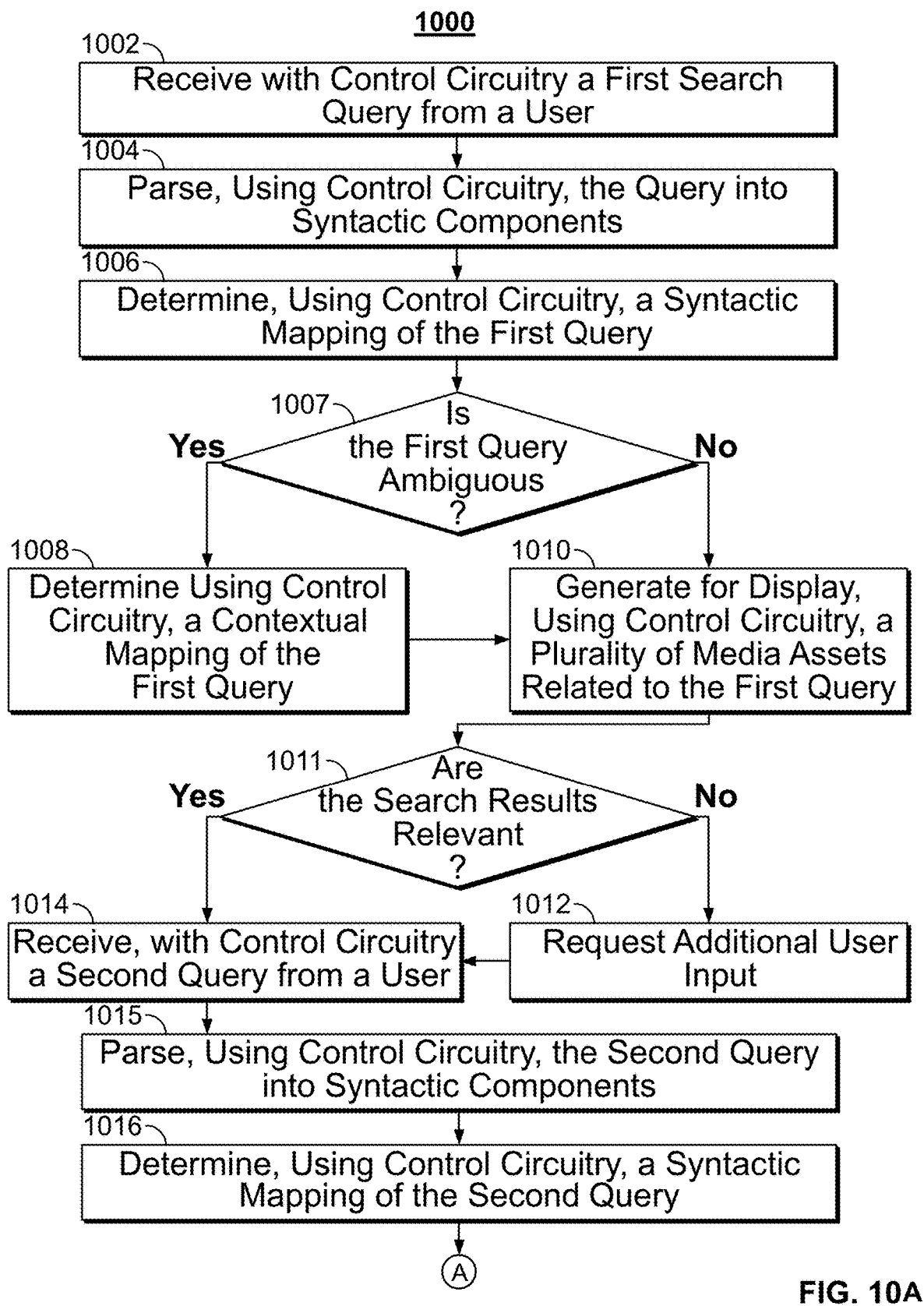
FIGS. 10A and 10B show a flow diagram of illustrative steps involved in searching for a media asset, in accordance with some embodiments of the disclosure.
Figure 10:
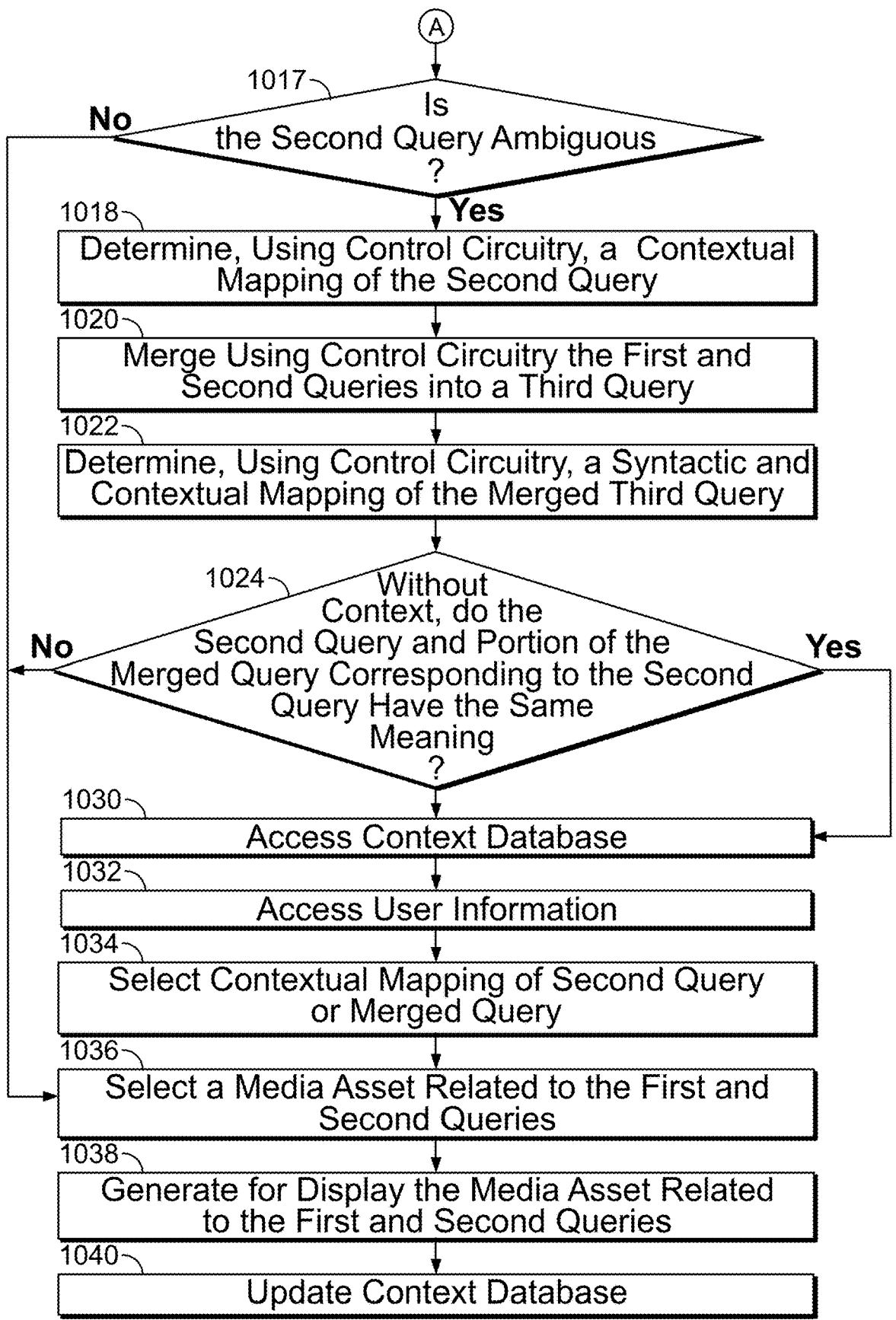

FIGS. 10A and 10B show a flow diagram of a process 1000 including illustrative steps involved in searching for a media asset, in accordance with some embodiments of the present disclosure. In some embodiments, process 1000 may be performed by control circuitry 304. In other embodiments, some steps of process 1000 may be performed by a combination of control circuitry 304 and control circuitry 902, as is discussed in relation to FIG. 9. For example, speech recognition engine 904, context classification engine 906, or search engine 908 may be executed on remote server 902 and remotely accessed or controlled by control circuitry 304.

At step 1002, control circuitry 304 receives a first search query from a user. For example, the first query "Show me some Beethoven movies," shown as search query 514 "Beethoven" and discussed in relation to FIG. 5. Control circuitry 304 may receive the search query in various forms. In a first embodiment, control circuitry 304 may receive a string of text entered by the user using a keyboard, by pressing buttons on a remote control unit, by pressing buttons associated with an on-screen keyboard, or by entering text in any other suitable way. In a second embodiment, control circuitry 304 may receive voice commands from the user in the form of speech data. The speech data may contain predefined voice commands (e.g., to denote that a voice command follows) as well as unrestricted and continuous speech uttered by the user. The speech data may be accompanied by control data, such as information related to a specific button pressed by the user on a remote control before or while providing the speech input. For example, the user may press a first button on a remote control to perform a first function based on the speech data. For example, the user may press a "search" button to perform a search for media assets corresponding to a search query represented by the speech data. Alternatively, the user may press an "action" button to execute a specific function with respect to a command represented by the voice data (e.g., change channels to a broadcast channel whose name is provided in the speech data).

In some aspects, control circuitry 304 may be available to receive a search query at any time, and may continuously look for search queries among input provided to control circuitry 304 (e.g., by continuously monitoring speech input from a microphone). In other aspects, the reception of a search query may be initiated by a trigger, such as a search command being issued by the user. In this case, control circuitry may not need to monitor speech input continuously but rather may look for a search query only in response to receiving a trigger signal.

At step 1004, control circuitry 304 parses the first search query into syntactic components. For example, control circuitry 304 may parse the query "Show me Beethoven movies" into "Show me," "Beethoven" and "movies." In the example discussed above with reference to FIG. 5, control circuitry 304 may display a portion of the query to the user, such as query 514, "Beethoven" in search query window 502.

At step 1006, control circuitry 304 analyzes the parsed syntactic components and determines that the query element "show me" is associated with a type of action or command, "movies" is associated with a type of media requested, and "Beethoven" is associated with the specifics of the media requested. At step 1006, the control circuitry determines, from a syntactical, i.e. grammatical and logical perspective, what the user is asking the system to do: e.g. to find and generate for display movies associated with the query term or keyword "Beethoven."

At step 1006, the control circuitry 304 determines whether the first query is ambiguous. In the event that the control circuitry 304 determines the first query is not ambiguous, control circuitry 304 proceeds to step 1010, to display the media assets related to the first query. However, if for example the control circuitry detects a speech-to-text recognition error, or an ambiguous term in the query, control circuitry determines that the first query is ambiguous. For example, as discussed in relation to FIG. 6, a query may detect term 614*b* "funny" or "furry" as a result of a speech-to-text recognition error, or determine that few search results match both "Beethoven" and "funny." In this case, control circuitry proceeds to step 1008.

At step 1008, control circuitry 304 determines a contextual mapping of the first search query. In the example discussed above with respect to FIG. 6, control circuitry 304 may alternatively determine additional information with respect to the search query, by assigning context identifiers to each term in the query, and accessing contextual information stored in contextual database 914, for example on storage 308, to determine whether "funny" or "furry" was really intended by the user. For example, user profile information stored in the contextual database 914 may indicate the user's love of classical music, such that when an ambiguity in genre arises, classical music is preferred. In an alternative example, control circuitry 304 may determine that "Beethoven," in the context of the conversation, i.e. the previous queries is a title. For example, the user may have been searching for several movie titles. Alternatively, the control circuitry 304 may determine that "Beethoven" in context is an author, for example if the user has been researching great men in previous queries. In an example, the contextual mapping of the first search query may be based on a stored context database, such as context database 914, based on stored user information, or based on both a contextual database and user information, e.g. a customized context database for a specific user, stored on storage 308, which is updated with contextual identifiers and rules after each query or conversation.

At step 1010, control circuitry 304 may generate for display a plurality of media assets related to the first query, i.e. related to the identified mappings of the first search query elements. Control circuitry 304 identifies media assets from a content database, e.g., media content source 416 or media asset database 916 or any other suitable content database. For example, as discussed in relation to FIG. 5, media assets related to Beethoven the composer are displayed, such as "Classical Composers," "Beethoven's plano," and "Immortal Beloved."

At step 1011, control circuitry 304 determines whether the search results generated for display at step 100 are relevant or sufficient. For example, control circuitry 304 may find a small set of results, or no results. As discussed in relation to FIG. 6, in response to query terms "Beethoven" and "Funny," control circuitry 304 may display element 608 "None" and element 612 "None" in the show times and streaming sections of the search results window 604. If control circuitry 304 finds that the search results are no relevant or insufficient, it proceeds to step 1012.

At step 1012, control circuitry requests additional user input, such as by asking the user to select an option or to provide a second query, to confirm, deny or clarify the first query and its results. For example, as discussed in relation to FIG. 6, control circuitry 304 displays an error, such as a possible interpretation error, and prompts the user for additional input. If at step 1011, control circuitry 304 determines that the search results are relevant, it proceeds to 1014, where it may receive the next query. For example, after search results for Beethoven the musician are displayed, as shown in FIG. 5, the control circuitry 304 may receive the next query, which may be "No, the dog," as discussed in relation to FIG. 7.

At step 1014, control circuitry 304 receives a second search query from a user, such as search query 714a-b, "No, the dog" discussed in relation to FIG. 7. In an alternative example, the new search query 714 may correspond to a subset of the media assets related to the first query, such as a subset related to Beethoven the composer movies, e.g. Beethoven documentaries.

For each user query, control circuitry 304 may analyze one or more of the entities and/or intent of the query, the search results, and contextual information from knowledge graph 800 to predict if there was an ASR problem in the user query. Control circuitry 304 may use one or more heuristics to predict a potential ASR problem including a weak classification score of the entities and/or intent in the query and a low relevance among search results after evaluating the user query.

At step 1015, control circuitry 304 may parse components of the second query into syntactic components. For example, referring to the query "No, the dog" discussed in relation to FIG. 7, the control circuitry may parse the query into a first element "No" and a second element "the dog."

At step 1016, control circuitry 304 may determine a syntactic mapping of the second query. As described in step 1006 for the first query, the control circuitry may determines using a syntactic mapping that first element "No" is a logical modifier, and that second element "the dog" is an additional media characteristic.

Alternatively, referring to a subsequent query "dog movies," the control circuitry may parse the second query into "dog" and "movies." Control circuitry 304 may retrieve the earlier context of search results with movies for entity "Beethoven" from knowledge graph 800. Control circuitry 304 may retrieve a subset of search results 704 corresponding to entity "the dog" along with an alert or message. For example, as shown in FIG. 7, the control circuitry 304 may display an alert: "I got some Beethoven the dog movies for you."

At step 1017, control circuitry 304 may determine whether the second query is ambiguous, as described in relation to step 1007 for the first query. As discussed in relation to FIG. 7, a negation element such as "No" in the query "No, the dog" may be ambiguous with respect to its application to earlier search results, e.g. the elements of the first query, or its application to the current query terms "the dog." In an alternative example, there may be no ambiguity in the terms of the second query, e.g. "Show me some Mozart movies," and the control circuitry 304 may proceed to step 1036.

At step 1018, when terms in the second query, such as "No" or "not" are ambiguous, control circuitry 304 may determine a contextual mapping of the second query. As described in step 1008 for the first query, using a context database such as context database 914, stored on storage 308, control circuitry 304 may assign the logical modifier "no" to the results of the first query.

At step 1020, control circuitry 304 may merge both of the first and second search queries into a third query. For example, the queries "Show me some Beethoven movies," and "No, the dog" may be merged to be analyzed as one merged query, which includes all of the terms present in the first and second query, in the same order.

At step 1022, control circuitry 304 may determine both syntactic and contextual mappings for the merged third query.

At step 1024, control circuitry 304 may determine whether the syntactic mappings of the second and third queries are equivalent, that is whether the set of syntactic identifiers associated with the second query is identical to the set of syntactic identifiers associated with the terms of the portion of the merged query corresponding to the second query. For example, in the example described above with respect to FIGS. 5 and 7, the second query "No, the dog" and the merged query "Show me some Beethoven movies. No, the dog," may have identical identifiers corresponding to the terms "No, the dog." For example, a syntactic mapping of the second query "No, the dog," may assign syntactic identifiers "negation" and "noun," to "No" and "dog," respectively. A syntactic mapping of the merged query may assign identifiers "verb" "user" "Object" and "object modifier" to the terms "Show" "me" "Beethoven" and "movies," respectively, based on the sentence structure. However, the syntactic identifiers of the terms of the merged query corresponding to the second query may be the same for the merged query and the second query, i.e. "Negation" and "Noun." In this example, there is no alternative identifier for "no" or for "the dog," provided by performing a syntactic mapping of the merged query. This lack of additional information obtained by the syntactic mapping of the merged query in this example is in contrast to additional information gained with respect to the "Show me" "the Today show" queries discussed above.

At step 1026, in the event that the syntactic mappings of the second query and corresponding portion of the third query are not equivalent, control circuitry 304 obtains a logical 'no' and proceeds to carry out steps 1036-1040, described below. For example, as described above, for a second query "Daily Show" and a merged query "Show me Daily Show" the terms "Daily Show", i.e. the terms in the portion of the merged query corresponding to the second query may be determined to have a different syntactic mapping within the merged query than on their own. For example, "Show" in the second query may be identified as an action verb, whereas in the merged query, it may be recognized as the target of an action verb.

At step 1028, in the event that the syntactic mappings of the second query and corresponding portion of the third query are equivalent, control circuitry 304 obtains a logical 'yes' and proceeds to step 1030. For example, as discussed with respect to the example of FIGS. 5 and 7, the second query "No, the dog" and the portion of the merged query "Show me some Beethoven movies. No, the dog" corresponding to the second query have identical syntactic mappings: no additional information is obtained on the meaning of the term "No." In this example, control circuitry may need to access context database 914 to obtain additional information for the ambiguous term "No."

At step 1030, control circuitry 304 may access a context database such as context database 914, stored on storage 308.

At step 1032, control circuitry 304 may access user information, such as information stored from previous search queries, individualized speech patterns, stored user search preferences, or a user profile, all stored on storage 308. For example, a user may have indicated a preference for search results of a certain size, a certain type, or from a certain time period. Alternatively, a user may have a profile indicating their geographical location, their language, and their interests or hobbies, stored on storage 308. In some examples, control circuitry 304 may perform both steps 1030 and 1032, in either order, or only one of those steps, depending on the level of ambiguity to be resolved, and any additional user input. For example, as discussed above in relation to FIG. 7, the control circuitry 304 may access a contextual rule that "No" generally applies to elements from a preceding query. However, control circuitry 304 may also determine from the user information embedded in contextual database 914 that for the specific user, another rule is more appropriate to determine the meaning of "No," such as a rule relating the position of "No" with respect to the length of a pause preceding it. In an alternative embodiment, control circuitry 304 may access additional stored user information, stored on storage 308, or preferences to refine the query.

At step 1034, control circuitry 304 may select a contextual mapping, the contextual mapping of either the second query or the merged query. For example, as discussed in relation to FIG. 7, and the contextual information accessed at steps 1030 and 1032, control circuitry 304 selects either the contextual mapping of the later query "No, the dog" and assigns the "No" to the earlier query for "Beethoven," or control circuitry 304 selects the contextual mapping of the merged query "Beethoven. No, the dog" and assigns the "No" to the earlier search results associated with "Beethoven," e.g. classical music results.

At step 1036, control circuitry 304 may select a media asset related to the first and second queries, according to the selected contextual mapping, which is consistent with user information. For example, if the contextual mapping of the merged query is selected, and the "No" is associated with earlier results for Beethoven, control circuitry 304 selects one or more media assets related to "Beethoven" but NOT the musician.

At step 1038, control circuitry 304 may generate for display the media asset. In some examples, control circuitry 304 may display multiple media assets.

At step 1040, control circuitry 304 may update a context database. In an example, the control circuitry 304 may update the context database, such as context database 914, with context identifiers and rules that apply for a typical user. Alternatively, the control circuitry 304 may update the context database 914 stored on storage 308, to include information about context identifiers and the rules governing their interaction, which is specific to the user. For example, if in the course of a conversation with the ACR system a user is determined to prefer classical music documentaries over comedies featuring animals, this preference may be stored in a customized knowledge database. Alternatively, or in addition, the user information fields may be updated. For example, if a user starts querying the system in Russian, the user profile may be automatically updated to return Russian media assets.

It is contemplated that the steps or descriptions of FIGS. 10A and 10B may be used with any other embodiment of this disclosure. In addition, the steps and descriptions described in relation to FIGS. 10A and 10B may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIGS. 10A and 10B.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:
1. A method comprising:
 receiving a first search query from a user;
 determining a first context, wherein the first context is related to a first media content genre, based on the received first search query;

determining a second context, wherein the second context is related to a second media content genre, based on user's search history related to the first search query;

computing a weak classification score comparing entities in the first search query with the user's search history;

determining, based on the weak classification score, that the first context is distinguished from the second context; and in response to the determination that the first context is distinguished from the second context:
generating notification to the user of the distinction between the first and the second contexts; and
using the second context to generate for display a plurality of indicators for a plurality of media assets that match the second context.

2. The method of claim 1, wherein the first search query is received as a speech input, further comprising using an automatic speech recognition technique to convert the received speech input into a textual format.

3. The method of claim 2, wherein the notification identifies the distinction between the first and the second contexts as an ASR error.

4. The method of claim 2, further comprising:
listing for selection, a plurality of selectable options;
receiving an input of a selection, from the plurality of selectable options; and
in response to the selection:
updating the generated plurality of indicators by displaying an updated plurality of indicators for a plurality of media assets that match the selection.

5. The method of claim 4, further comprising:
receiving a second search query from the user; and
processing the second search query based on the first context in absence of receiving the selection.

6. The method of claim 1, further comprising:
generating a knowledge graph based on the second context; and
determining that the first context is distinguished from the second context based on the generated knowledge graph.

7. The method of claim 1, wherein the notification includes a message of inconsistency between the first and the second contexts.

8. The method of claim 1, further comprising:
determining that user search history related to the first search query is not available; and
in response to the determination, generating an error message to the user.

9. The method of claim 8, wherein the error message includes an alternative interpretation of the first search query.

10. A system comprising:
control circuitry configured to:
receive a first search query from a user;
determine a first context, wherein the first context is related to a first media content genre, based on the received first search query;
determine a second context, wherein the second context is related to a second media content genre, based on user's search history related to the first search query;
compute a weak classification score comparing entities in the first search query with the user's search history;
determining, based on the weak classification score, that the first context is distinguished from the second context; and
in response to the determination that the first context is distinguished from the second context:
generate notification to the user of the distinction between the first and the second contexts; and
use the second context to generate for display a plurality of indicators for a plurality of media assets that match the second context.

11. The system of claim 10, wherein the first search query is received by the control circuitry as a speech input, and wherein the control circuitry is further configured to use an automatic speech recognition technique to convert the received speech input into a textual format.

12. The system of claim 11, wherein the notification identifies the distinction between the first and the second contexts as an ASR error.

13. The system of claim 11, further comprising, the control circuitry configured to:
list for selection, a plurality of selectable options;
receive an input of a selection, from the plurality of selectable options; and
in response to the selection:
update the generated plurality of indicators by displaying an updated plurality of indicators for a plurality of media assets that match the selection.

14. The system of claim 13, further comprising, the control circuitry configured to:
receive a second search query from the user; and
process the second search query based on the first context in absence of receiving the selection.

15. The system of claim 10, further comprising, the control circuitry configured to:
determine that user search history related to the first search query is not available; and
in response to the determination, generate an error message to the user.

16. The system of claim 15, wherein the error message generated by the control circuitry includes an alternative interpretation of the first search query.

17. The method of claim 1, wherein the computing the weak classification score comparing entities in the first search query with the user's search history comprises:
identifying nouns, verbs, adjectives, pronouns, contractions, and punctuation based on pauses between query terms of the first search query;
modifying the first search query by removing articles and query terms that are clear from context from the first search query;
selecting, using a knowledge graph, a set of candidate identifiers based on the modified first search query;
assigning an identifier to the user's search history based on the user's search history;
comparing the identifier for the user's search history to the set of candidate identifiers for the modified first search query.

18. The system of claim 10, wherein the control circuitry is further configured to compute the classification score comparing entities in the first search query with the user's search history by:
identifying nouns, verbs, adjectives, pronouns, contractions, and punctuation based on pauses between query terms of the first search query;
modifying the first search query by removing articles and query terms that are clear from context from the first search query;
selecting, using a knowledge graph, a set of candidate identifiers based on the modified first search query;

assigning an identifier to the user's search history based on the user's search history;

comparing the identifier for the user's search history to the set of candidate identifiers for the modified first search query.

\* \* \* \* \*